US008712076B2

(12) United States Patent
Dickins

(10) Patent No.: US 8,712,076 B2
(45) Date of Patent: Apr. 29, 2014

(54) POST-PROCESSING INCLUDING MEDIAN FILTERING OF NOISE SUPPRESSION GAINS

(71) Applicant: Dolby Laboratories Licensing Corporation, San Francisco, CA (US)

(72) Inventor: Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 13/963,972

(22) Filed: Aug. 9, 2013

(65) Prior Publication Data

US 2013/0322640 A1 Dec. 5, 2013

Related U.S. Application Data

(63) Continuation of application No. PCT/US2012/024372, filed on Feb. 8, 2012.

(51) Int. Cl.
*H04B 15/00* (2006.01)

(52) U.S. Cl.
USPC .......................................... 381/94.3; 704/226

(58) Field of Classification Search
USPC ......................... 381/94.1, 94.3; 704/225, 226
See application file for complete search history.

(56) References Cited

U.S. PATENT DOCUMENTS

| | | | |
|---|---|---|---|
| 3,989,897 A | 11/1976 | Carver | |
| 4,185,168 A | 1/1980 | Graupe et al. | |
| 4,941,187 A | 7/1990 | Slater | |
| 5,579,404 A | 11/1996 | Fielder et al. | |
| 5,648,955 A | 7/1997 | Jensen et al. | |
| 5,659,622 A | 8/1997 | Ashley | |
| 5,742,694 A | 4/1998 | Eatwell | |
| 5,742,927 A | 4/1998 | Crozier et al. | |
| 5,812,970 A * | 9/1998 | Chan et al. | 704/226 |
| 5,899,969 A | 5/1999 | Fielder et al. | |
| 5,903,872 A | 5/1999 | Fielder | |
| 5,913,190 A | 6/1999 | Fielder et al. | |

(Continued)

FOREIGN PATENT DOCUMENTS

| | | |
|---|---|---|
| DE | 4405723 | 8/1995 |
| EP | 0669606 | 8/1995 |

(Continued)

OTHER PUBLICATIONS

Simmer et al., "Adaptive Microphone Arrays for Noise Suppression in the Frequency Domain", Second Cost 229 Workshop on Adaptive Algorithms in Communications, Bordeaux, 1992, http://www.ant.uni-bremen.de/sixcms/media.php/102/4975/cost_1992_simmer.pdf.*

(Continued)

*Primary Examiner* — Joseph Saunders, Jr.
(74) *Attorney, Agent, or Firm* — Dov Rosenfeld; Inventek

(57) ABSTRACT

A method of post-processing raw banded gains for applying to an audio signal, an apparatus to generate banded post-processed gains, and a tangible computer-readable storage medium comprising instructions that when executed carry out the method. The raw banded gains are determined by input processing one or more input audio signals. The method includes applying post-processing to the raw banded gains to generate banded post-processed gains, generating a particular post-processed gain for a particular frequency band, including median filtering using raw gain values for frequency bands adjacent to the particular frequency band. One or more properties of the post-processing depend on classification of the one or more input audio signals.

41 Claims, 8 Drawing Sheets

(56) References Cited

U.S. PATENT DOCUMENTS

| | | | |
|---|---|---|---|
| 5,913,191 | A | 6/1999 | Fielder |
| 6,122,610 | A | 9/2000 | Isabelle |
| 6,124,895 | A | 9/2000 | Fielder |
| 6,246,760 | B1 | 6/2001 | Makino et al. |
| 6,253,185 | B1 | 6/2001 | Arean et al. |
| 6,351,731 | B1 | 2/2002 | Anderson et al. |
| 6,415,253 | B1 | 7/2002 | Johnson |
| 6,453,285 | B1 | 9/2002 | Anderson et al. |
| 6,647,367 | B2 | 11/2003 | McArthur et al. |
| 6,668,062 | B1 | 12/2003 | Luo et al. |
| 6,717,991 | B1 | 4/2004 | Gustafsson et al. |
| 6,765,931 | B1 | 7/2004 | Rabenko et al. |
| 6,766,292 | B1 | 7/2004 | Chandran et al. |
| 6,839,666 | B2 | 1/2005 | Chandran et al. |
| 7,020,291 | B2 | 3/2006 | Buck et al. |
| 7,062,040 | B2 | 6/2006 | Faller |
| 7,313,518 | B2 | 12/2007 | Scalart et al. |
| 7,328,162 | B2 | 2/2008 | Liljeryd et al. |
| 7,376,558 | B2 | 5/2008 | Gemello et al. |
| 7,383,179 | B2 | 6/2008 | Alves et al. |
| 7,454,010 | B1 | 11/2008 | Ebenezer |
| 7,492,889 | B2 | 2/2009 | Ebenezer |
| 7,499,855 | B2 | 3/2009 | Schweng |
| 7,555,075 | B2 | 6/2009 | Pessoa et al. |
| 7,558,729 | B1 | 7/2009 | Benyassine et al. |
| 7,649,988 | B2 | 1/2010 | Suppappola et al. |
| 7,756,700 | B2 | 7/2010 | Rose et al. |
| 7,773,741 | B1 | 8/2010 | LeBlanc et al. |
| 7,801,733 | B2 | 9/2010 | Lee et al. |
| 7,835,407 | B2 | 11/2010 | LeBlanc et al. |
| 2001/0036278 | A1 | 11/2001 | Polisset et al. |
| 2003/0009325 | A1 | 1/2003 | Kirchherr et al. |
| 2004/0054528 | A1 | 3/2004 | Hoya et al. |
| 2004/0057574 | A1 | 3/2004 | Faller |
| 2004/0078199 | A1 | 4/2004 | Kremer et al. |
| 2005/0143989 | A1 | 6/2005 | Jelinek |
| 2005/0288923 | A1 | 12/2005 | Kok |
| 2006/0072768 | A1 | 4/2006 | Schwartz et al. |
| 2006/0184363 | A1 | 8/2006 | McCree et al. |
| 2006/0188104 | A1 | 8/2006 | De Poortere |
| 2006/0270467 | A1 | 11/2006 | Song et al. |
| 2007/0046540 | A1 | 3/2007 | Taenzer |
| 2007/0047742 | A1 | 3/2007 | Taenzer et al. |
| 2007/0047743 | A1 | 3/2007 | Taenzer et al. |
| 2007/0050161 | A1 | 3/2007 | Taenzer et al. |
| 2007/0050176 | A1 | 3/2007 | Taenzer et al. |
| 2007/0050441 | A1 | 3/2007 | Taenzer et al. |
| 2007/0076898 | A1 | 4/2007 | Sarroukh et al. |
| 2007/0133825 | A1 | 6/2007 | Waller, Jr. |
| 2007/0136053 | A1 | 6/2007 | Ebenezer |
| 2008/0159559 | A1 | 7/2008 | Akagi et al. |
| 2008/0162121 | A1 | 7/2008 | Son et al. |
| 2008/0167866 | A1 | 7/2008 | Hetherington et al. |
| 2008/0170706 | A1 | 7/2008 | Faller |
| 2008/0192946 | A1 | 8/2008 | Faller |
| 2008/0232607 | A1 | 9/2008 | Tashev et al. |
| 2008/0288219 | A1 | 11/2008 | Tashev et al. |
| 2008/0310643 | A1 | 12/2008 | Alves et al. |
| 2008/0317259 | A1 | 12/2008 | Zhang et al. |
| 2009/0010444 | A1 | 1/2009 | Goldstein et al. |
| 2009/0012786 | A1 | 1/2009 | Zhang et al. |
| 2009/0024387 | A1 | 1/2009 | Chandran et al. |
| 2009/0034747 | A1 | 2/2009 | Christoph |
| 2009/0055170 | A1 | 2/2009 | Nagahama |
| 2009/0063143 | A1 | 3/2009 | Schmidt et al. |
| 2009/0074209 | A1 | 3/2009 | Thompson et al. |
| 2009/0076829 | A1 | 3/2009 | Ragot et al. |
| 2009/0123003 | A1 | 5/2009 | Sibbald |
| 2009/0129582 | A1 | 5/2009 | Chandran et al. |
| 2009/0154380 | A1 | 6/2009 | LeBlanc |
| 2009/0164212 | A1 | 6/2009 | Chan et al. |
| 2009/0238373 | A1 | 9/2009 | Klein |
| 2009/0240491 | A1 | 9/2009 | Reznik |
| 2009/0254340 | A1 | 10/2009 | Sun et al. |
| 2009/0262969 | A1 | 10/2009 | Short et al. |
| 2009/0313009 | A1 | 12/2009 | Kovesi et al. |
| 2010/0014695 | A1 | 1/2010 | Breithaupt et al. |
| 2010/0017195 | A1 | 1/2010 | Villemoes |
| 2010/0017204 | A1 | 1/2010 | Oshikiri et al. |
| 2010/0023327 | A1 | 1/2010 | Jung et al. |
| 2010/0023335 | A1 | 1/2010 | Szczerba et al. |
| 2010/0076769 | A1 | 3/2010 | Yu |
| 2010/0104113 | A1 | 4/2010 | Liu |
| 2010/0121646 | A1 | 5/2010 | Ragot et al. |
| 2010/0142718 | A1 | 6/2010 | Chin et al. |
| 2010/0211385 | A1 | 8/2010 | Sehlstedt |
| 2010/0241426 | A1 | 9/2010 | Zhang et al. |
| 2010/0280824 | A1 | 11/2010 | Petit et al. |
| 2010/0323652 | A1 | 12/2010 | Visser et al. |
| 2011/0038489 | A1 | 2/2011 | Visser et al. |

FOREIGN PATENT DOCUMENTS

| | | |
|---|---|---|
| EP | 0727769 | 8/1996 |
| EP | 1786236 | 9/2002 |
| EP | 1635331 | 3/2006 |
| EP | 2096629 | 9/2009 |
| FR | 2624675 | 6/1989 |
| GB | 643574 | 9/1950 |
| GB | 645343 | 11/1950 |
| GB | 2126851 | 3/1984 |
| GB | 2437868 | 11/2007 |
| JP | 2009-021741 | 1/2009 |
| JP | 2010-102199 | 5/2010 |
| KR | 100888049 | 3/2009 |
| KR | 100938282 | 1/2010 |
| KR | 20100045933 | 5/2010 |
| KR | 20100045934 | 5/2010 |
| KR | 20100114059 | 10/2010 |
| WO | WO 01/19005 | 3/2001 |
| WO | WO 01/73759 | 10/2001 |
| WO | WO 2004/111994 | 12/2004 |
| WO | WO 2006/111369 | 10/2006 |
| WO | WO 2006/111370 | 10/2006 |
| WO | WO 2008/115435 | 9/2008 |
| WO | WO 2008/115445 | 9/2008 |
| WO | WO 2009/043066 | 4/2009 |
| WO | WO 2009/066869 | 5/2009 |
| WO | WO 2009/092522 | 7/2009 |
| WO | WO 2009/095161 | 8/2009 |
| WO | WO 2009/097009 | 8/2009 |
| WO | WO 2009/109050 | 9/2009 |
| WO | WO 2010/048620 | 4/2010 |
| WO | WO 2010/069885 | 6/2010 |
| WO | WO 2010/092568 | 8/2010 |
| WO | WO 2010/105926 | 9/2010 |
| WO | WO 2010/127616 | 11/2010 |
| WO | WO 2012/107561 | 8/2012 |
| WO | WO 2012/109019 | 8/2012 |

OTHER PUBLICATIONS

U.S. Appl. No. 61/108,447, filed Oct. 24, 2008, Visser.

U.S. Appl. No. 61/185,518, filed Jun. 9, 2009, Visser.

U.S. Appl. No. 61/240,318, filed Sep. 8, 2009, Visser.

Audone, B. et al, "The Use of Music Algorithm to Characterize Emissive Sources," Electromagnetic Compatibility, IEEE Transactions on, vol. 43, Issue, 4, pp. 688-693, 2001.

Avendano, C. et al, "STFT-Based Multi-Channel Acoustic Interference Suppressor", Proceedings 2001 IEEE International Conference on Acoustics, Speech, and Signal Processing, 2001, (ICASSP'01), vol. 1, pp. 625-628, 2002.

Boll, S. et al, "Suppression of Acoustic Noise in Speech Using Two Microphone Adaptive Noise Cancellation," IEEE Transactions on Acoustics, Speech, and Signal Processing, vol. 28, Issue 6, Dec. 1, 1980.

Campbell, "Adaptive Beamforming Using a Microphone Array for Hands-Free Telephony", Technical Report and M.S. Thesis, Bradley Department of Electrical and Computer Engineering, Virginia Polytechnic Institute and State University, Feb. 1999. Retrieved Jan. 24, 2011 at http://scholar.lib.vt.edu/theses/available/etd-022099-122645/.

(56) References Cited

OTHER PUBLICATIONS

Cohen et al, "An Integrated Real-Time Beamforming and Postfiltering System for Non-Stationary Noise Environments", EURASIP Journal on Applied Signal Processing, vol. 2003, Jan. 2003. Retrieved Jan. 24, 2011 at http://www.andreaelectronics.com/pdf_files/JASP.pdf.

Cohen et al, "Speech enhancement for non-stationary noise environments", Signal Processing, vol. 81, pp. 2403-2418, 2001.

Combined Acoustic Noise and Echo Canceller (CANEC), Retrieved Jan. 24, 2011 from the Web Archive of Mar. 27, 2008 at http://web.archive.org/web/20080327132154/http://www.dspalgorithms.com/products/canec.html. Therefore, retrieavable Mar. 2008 at http://www.dspalgorithms.com/products/canec.html.

Dam et al, "Multi-channel adaptive beamforming with source spectral and noise covariance matrix estimations", 2005 International Workshop on Acoustic Echo and Noise Control, High Tech Campus, Eindhoven, The Netherlands, 2005, retrieved Jun. 26, 2010 at iwaenc05.ele.tue.nl/proceedings/papers/502-03.pdf.

Dickins et al, "On the spatial localization of a wireless transmitter from a multisensor receiver", 2nd International Conference on Signal Processing and Communication Systems, ICSPCS, 2008.

Dickins, "Applications of Continuous Spatial Models in Multiple Antenna Signal Processing", 2007, Australian National University: Canberra, downloaded on May 6, 2010 at http://thesis.anu.edu.au/public/adt-ANU20080702.222814/ index.html.

Doblinger, "An Adaptive Microphone Array for Optimum Beamforming and Noise Reduction", in Proc. EUSIPCO 14th European Signal Processing Conference, Florence, Italy, Sep. 2006. Retrieved Jan. 24, 2011 at http://publik.tuwien.ac.at/files/pub-et_11270.pdf.

Faller et al, "Suppressing Acoustic Echo in a Spectral Envelope Space", IEEE Transactions on Speech and Audio Processing, vol. 13, No. 5, pp. 1048-1062, Sep. 2005.

Faller, C., "Perceptually Motivated Low Complexity Acoustic Echo Control," Convention Paper 5783, Presented at the 114th Convention of the Audio Engineering Society, Mar. 22-25 2003, Amsterdam, The Netherlands.

Farrell et al, "Beamforming microphone arrays for speech enhancement," ICASSP-92, vol. 1, pp. 285-288, IEEE International Conference on Acoustics, Speech, and Signal Processing, 1992.

Favrot et al, "Perceptually Motivated Gain Filter Smoothing for Noise Suppression", Convention Paper, 123rd Convention of the Audio Engineering Society, Oct. 5-8, 2007 New York, NY, USA.

Favrot et al., "Acoustic Echo Control Based on Temporal Fluctuations of Short Time Spectra", in Proc. 11th International Workshop on Acoustic Echo and Noise Control, Sep. 14-17, 2008, Seattle, WA, USA. Retrieved Jan. 24, 2011 at http://deckard.engr.washington.edu/epp/iwaenc2008/proceedings/contents/papers/9049.pdf.

Goh et al, "Postprocessing method for suppressing musical noise generated by spectral subtraction", IEEE Trans. on Speech and Audio Processing, vol. 6, No. 3, pp. 287-292, 1998.

Habets et al, "Robust Early Echo Cancellation and Late Echo Suppression in the STFT Domain", in Proc. 11th International Workshop on Acoustic Echo and Noise Control, Sep. 14-17, 2008, Seattle, WA, USA. Retrieved Jan. 24, 2011 at http://deckard.engr.washington.edu/epp/iwaenc2008/proceedings/contents/papers/9034.pdf.

Heller et al, "A General Formulation of Modulated Filter Banks", IEEE Transactions on Signal Processing, vol. 47, No. 4, Apr. 1999.

Herbordt et al, "Joint Optimization of Lcmv Beamforming and Acoustic Echo Cancellation for Automatic Speech Recognition," Proceedings IEEE International Conference on Acoustics, Speech, and Signal Processing, 2005, Mar. 18-23, 2005, vol. 3, pp. iii/77-iii/80, 2005.

Herbordt et al, "Joint optimization of LCMV beamforming and acoustic echo cancellation", European signal processing conference; EUSIPCO—2004, retrieved Oct. 18, 2009 from http://citeseerx.ist.psu.edu/viewdoc/download?doi=10.1.1.142.287&rep=repl&type=pdf.

Johnson, D. et al, "Array Signal Processing: Concepts and Techniques," Feb. 11, 1993, Edition 1.

Kallinger et al, "Study on combining multi-channel echo cancellers with beamformers", Proc. 2000 IEEE Intl. Conference on Acoustics, Speech, and Signal Processing, vol. 2, pp. II797-II800, 2000.

Kellerman, "Strategies for combining acoustic echo cancellation and adaptive beamforming microphone arrays", 1997 IEEE International Conference on Acoustics, Speech, and Signal Processing, Apr. 21-24, 1997, vol. 1, pp. 219-222, 1997.

Kuech et al., "Acoustic Echo Suppression Based on Separation of Stationary and Non-Stationary Echo Components", in Proc. 11th International Workshop on Acoustic Echo and Noise Control, Sep. 14-17, 2008, Seattle, WA, USA. Retrieved Jan. 24, 2011 at http://deckard.engr.washington.edu/epp/iwaenc2008/proceedings/contents/papers/9043.pdf.

Linhard et al, "Noise reduction with spectral subtraction and median filtering for suppression of musical tones", In Proc. of ESCA-NATO Workshop on Robust Speech Recognition for Unknown Communication Channels, pp. 159-162, Pont-a-Mousson, France, Apr. 1997.

Lukin et al, "Suppression of Musical Noise Artifacts in Audio Noise Reduction by Adaptive 2D Filtering", Convention Paper, 123rd Convention of the Audio Engineering Society, Oct. 5-8, 2007, New York, NY, USA.

Mabande et al, "Design of robust superdirective beamformers as a convex optimization problem", Proceedings, IEEE International Conference on Acoustics, Speech and Signal Processing, 2009. ICASSP 2009. pp. 77-80, 2009.

Martin, "Spectral Subtraction Based on Minimum Statistics", Proceedings of European Signal Processing Conference (EUSIPCO), Sep. 1994, pp. 1182-1185, 1994.

Martin, "Statistical Methods for the Enhancement of Noisy Speech", in International Workshop on Acoustic Echo and Noise Control (IWAENC2003), Sep. 2003, Kyoto, Japan, 2003.

Martin, R., "Spectral Subtraction Based on Minimum Statistics," in Proc. European Signal Processing Conference (EUSIPCO), pp. 1182-1185, 1994.

Moore, B. et al, "A Model for the Prediction of Thresholds, Loudness, and Partial Loudness," Journal of the Audio Engineering Society (AES), vol. 5, Issue 4, pp. 224-240, Apr. 1997.

Pulkki et al, "Directional audio coding—perception-based reproduction of spatial sound", International Workshop on the Principles and Applications of Spatial Hearing, Zao, Miyagi, Japan, Nov. 11-13, 2009.

Rabiner et al, "Applications of a Nonlinear Smoothing Algorithm to Speech Processing", IEEE Transactions on Acoustic, Speech, and Signal Processing, vol. ASSP-23, No. 6, pp. 552-557, Dec. 1975.

Roy, R. et al, "A Subspace Rotation Approach to Estimation, of Parameters of Cisoids in Noise," IEEE Transactions Acoustics Speech and Signal Processing, vol. 34, Issue 5, pp. 1340-1342, 1986.

Simmer et al, "Adaptive Microphone Arrays for Noise Suppression in the Frequency Domain", Second Cost 229 Workshop on Adaptive Algorithms in Communications, Bordeaux, 1992, retrieved Jun. 26, 2010 at http://www.ant.eni-bremen.de/sixcms/media/php/102/4975/COST_1992_simmer.pdf.

Stoica, P. et al, "MUSIC, Maximum Likelihood, and Cramer-Rao Bound," IEEE Transactions Acoustic, Speech, and Signal Processing, vol. 37, Issue 5, pp. 720-741, 1989.

Unpublished U.S. Appl. No. 13/366,148, filed Feb. 3, 2012 to inventor Taenzer and titled "Vector Noise Cancellation".

Unpublished U.S. Appl. No. 13/366,160, filed Feb. 3, 2012 to inventors Taenzer et al and titled "Vector Noise Cancellation".

Van Trees, H. et al, Detection, Estimation, and Modulation Theory: Optium Array Processing, 2002, New York.

Wax, M. et al, "On Unique Localization of Multiple Sources by Passive Sensor Arrays," IEEE Transactions Acoustic, Speech and Signal Processing, vol. 37, Issue 7, pp. 996-1000, 1989.

Wittkop, T. et al, "Speech Processing for Hearing Aids: Noise Reduction Motivated by Models of Binaural Interaction," Acta Acustica, Editions De Physique, vol. 83, Issue 4, Jan. 1, 1997.

(56) References Cited

OTHER PUBLICATIONS

Yoon et al, "Robust Adaptive Beamforming Algorithm Using Instantaneous Direction of Arrival with Enhanced Noise Suppression Capability", in Processdings, IEEE International Conference on Acoustics, Speech and Signal Processing. ICASSP 2007,. 2007.

Pulsipher et al, "Reduction of nonstationary acoustic noise in speech using LMS adaptive noise cancelling", IEEE International Conference on Acoustics, Speech, and Signal Processing, Apr. 1979, pp. 204-207.

Widrow et al, "Adaptive Noise Cancelling: Principles and Applications", Proceedings of the IEEE, vol. 63, No. 12, Dec. 1975.

Boll, "Suppression of Acoustic Noise in Speech Using Spectral Subtraction", IEEE Transactions on Acoustics, Speech, and Signal Processing, vol. ASSP-27, No. 2, Apr. 1979.

International Preliminary Report on Patentability on PCT Application No. PCT/US2012/024370 mailed Jun. 24, 2013.

International Search Report and Written Opinion on PCT Application No. PCT/US2012/024372 mailed Jun. 5, 2012.

International Preliminary Report on Patentability on PCT Application No. PCT/US2012/024372 mailed May 13, 2013.

* cited by examiner

POST-PROCESSING INCLUDING MEDIAN FILTERING OF NOISE SUPPRESSION GAINS

RELATED PATENT APPLICATIONS

The present application is a continuation of International Application No. PCT/US2012/024372, filed with an international filing date of 8 Feb. 2012. International Application No. PCT/US2012/024372 claims priority of U.S. Provisional Application No. 61/441,611 filed 10 Feb. 2011. The contents of both Applications Nos. PCT/US2012/024372 and 61/441,611 are incorporated herein by reference in their entirety.

The present application is related to concurrently filed International Application No. PCT/US2012/024370 titled COMBINED SUPPRESSION OF NOISE, ECHO, and OUT-OF-LOCATION SIGNALS, filed with an international filing date of 8 Feb. 2012, that also claims priority of U.S. Provisional Application No. 61/441,611 filed 10 Feb. 2011. The contents of such Application No. PCT/US2012/024370 are incorporated herein by reference in their entirety.

The present application is related to the following U.S. provisional patent applications.

U.S. Provisional Patent Application No. 61/441,396, titled "VECTOR NOISE CANCELLATION" to inventor Jon C. Taenzer, Client Ref. No. A09070USP1.

U.S. Provisional Patent Application No. 61/441,397, titled "VECTOR NOISE CANCELLATION" to inventors Jon C. Taenzer and Steven H. Puthuff, Client Ref. No. A09071USP1.

U.S. Provisional Patent Application No. 61/441,528, titled "MULTI-CHANNEL WIND NOISE SUPPRESSION SYSTEM AND METHOD" to inventor Jon C. Taenzer, to which U.S. Patent publication No. US20120207325A1 filed Aug. 16, 2012 claims priority.

U.S. Provisional Patent Application No. 61/441,551, titled "SYSTEM AND METHOD FOR WIND DETECTION AND SUPPRESSION" to inventors Glenn N. Dickins and Leif Jonas Samuelsson, such U.S. application No. 61/441,551 being referred to as the "Wind Detection/Suppression Application" herein. PCT publication No. WO2012109019, published 16 Aug. 2012, claims priority to, and is substantially the same as such U.S. application No. 61/441,551.

U.S. Provisional Patent Application No. 61/441,633, titled "SPATIAL ADAPTATION FOR MULTI-MICROPHONE SOUND CAPTURE" to inventor Leif Jonas Samuelsson. PCT publication No. WO2012107561, published 16 Aug. 2012, claims priority to, and is substantially the same as such U.S. Application 61/441,633

FIELD OF THE INVENTION

The present disclosure relates generally to signal processing, in particular of audio signals.

BACKGROUND

Acoustic signal processing is applicable today to improve the quality of sound signals such as from microphones. As one example, many devices such as handsets operate in the presence of sources of echoes, e.g., loudspeakers. Furthermore, signals from microphones may occur in a noisy environment, e.g., in a car or in the presence of other noise. Furthermore, there may be sounds from interfering locations, e.g., out-of-location conversation by others, or out-of-location interference, wind, etc. Acoustic signal processing is therefore an important area for invention.

Processing systems are known for one or more of suppressing noise, suppressing echo, and adding spatial selectivity. An acoustic noise reduction system typically includes a noise estimator and a gain calculation module to determine suppression probability indicators, e.g., as a set of noise reduction gains that are determined, for example, on a set of frequency bands, and applied to the (noisy) input audio signal after transformation to the frequency domain and banding to the set of frequency bands to attenuate noise components. The acoustic noise reduction system may include one microphone input, or a plurality of microphone inputs and downmixing, e.g., beamforming to generate one input audio signal. The acoustic noise reduction system may further include echo reduction, and may further include out-of-location signal reduction.

Musical noise is known to exist, and might occur because of short term mistakes over time made on the gain in some of the bands. Such gains-in-error can be considered statistical outliers, that is, values of the gain that across a group of bands statistically lie outside an expected range, so appear "isolated."

Such statistical outliers might occur in other types of processing in which an input audio signal is transformed and banded. Such other types of processing include perceptual domain-based leveling, perceptual domain-based dynamic range control, and perceptual domain-based dynamic equalization that takes into account the variation in the perception of audio depending on the reproduction level of the audio signal. See, for example, International Application PCT/US2004/016964, published as WO 2004111994. It is possible that the gains determined for each band for leveling and/or dynamic equalization include statistical outliers, e.g., isolated values, and such outliers might cause artifacts such as musical noise.

Median filtering the gains, e.g., noise reduction gains, or leveling and/or dynamic equalization gains across frequency bands can reduce musical noise artifacts. German Patent Application Publication DE4405723A1, also published as European Patent Publication EP0669606, describes the use of median filtering for the reduction of "musical tones" which may occur in the context of spectral subtraction.

Gain values may vary significantly across frequencies, and in such a situation, running a relatively wide median filter along frequency bands has the risk of disrupting the continuity of temporal envelope, which is the inherent property for many signals and is crucial to perception as well. Whilst offering greater immunity to the outliers, a longer median filter can reduce the spectral selectivity of the processing, and potentially introduce greater discontinuities or jumps in the gain values across frequency and time.

The approaches described in this BACKGROUND section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

DESCRIPTION OF EXAMPLE EMBODIMENTS

Overview

Figure 1:
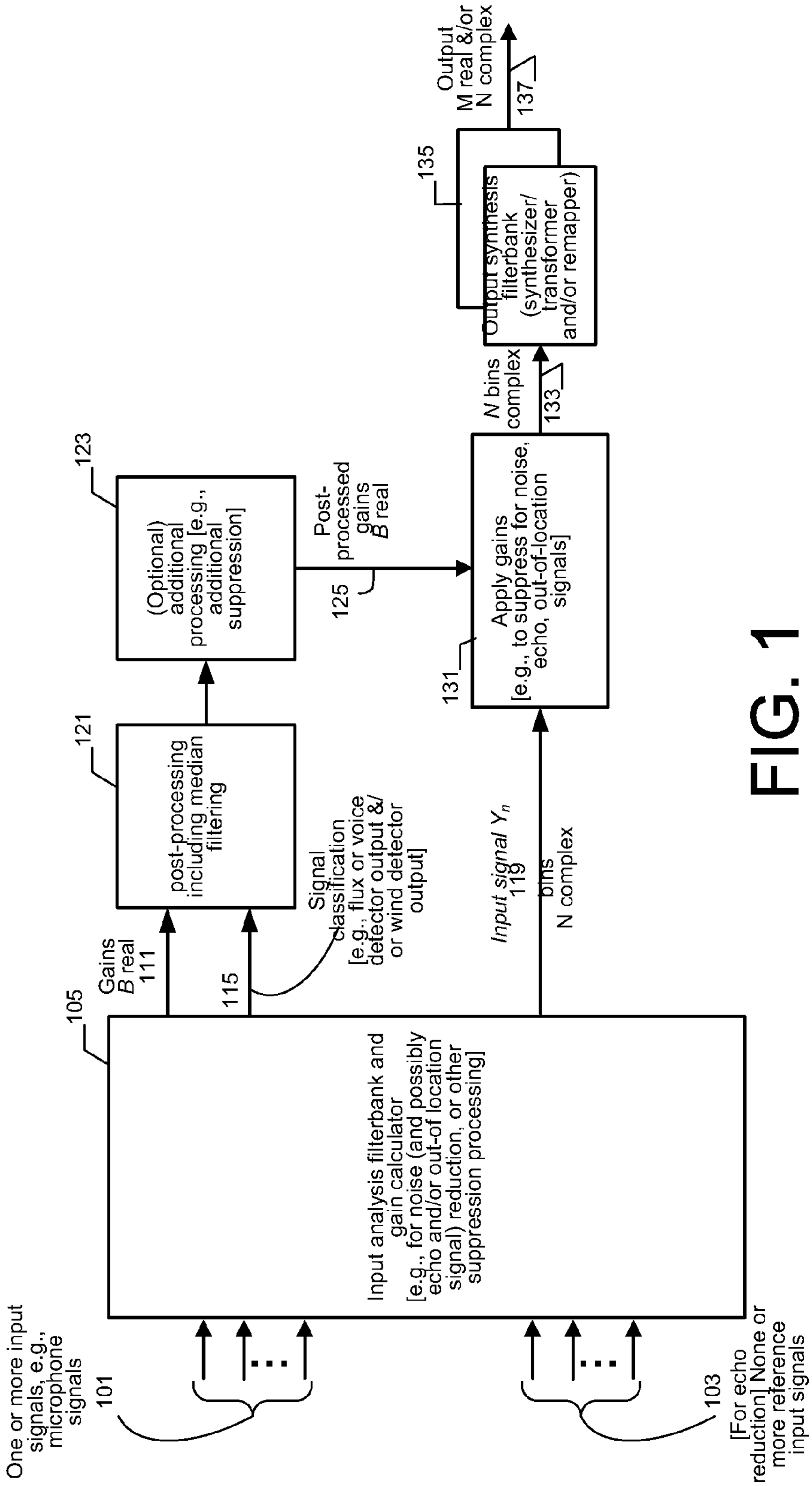
FIG. 1 shows one example of processing of a set of one or more input audio signals, e.g., microphone signals 101 from differently located microphones, including an embodiment of the present invention.

Embodiments of the present invention include a method, an apparatus, and logic encoded in one or more computer-readable tangible media to carry out the method.

One embodiment includes a method of applying post-processing to raw banded gains to improve the raw banded gains for applying to one or more input audio signals. The raw banded gains at a plurality of frequency bands comprising one or more frequency bins are determined by input processing the one or more input audio signals. The raw banded gains are to carry out one or more of reducing noise, reducing out-of-location signals, reducing echoes, perceptual domain-based leveling, perceptual domain-based dynamic range control, and perceptual domain-based dynamic equalization. The method comprises applying post-processing to the raw banded gains to generate banded post-processed gains. Generating of a particular post-processed gain for a particular frequency band includes at least median filtering using gain values for frequency bands adjacent to the particular frequency band. The post-processing is according to one or more properties, including an end condition and a width for the median filtering. At least one property of the post-processing depends on signal classification of the one or more input audio signals.

One embodiment includes a method of processing one or more input audio signals. The method includes input processing one or more input audio signals to determine raw banded gains for applying to an audio signal, the raw banded gains being at a plurality of frequency bands comprising one or more frequency bins. The raw banded gains are to carry out one or more of reducing noise, reducing out-of-location signals, reducing echoes, perceptual domain-based leveling, perceptual domain-based dynamic range control, and perceptual domain-based dynamic equalization. The method further comprises applying post-processing to the raw banded gains to generate banded post-processed gains. Generating of a particular post-processed gain for a particular frequency band includes at least median filtering using gain values for frequency bands adjacent to the particular frequency band. The post-processing is according to one or more properties, including an end condition and a width for the median filtering. At least one property of the post-processing depends on signal classification of the one or more input audio signals.

One embodiment includes an apparatus to post-process raw banded gains for applying to one or more input audio signals. The raw banded gains at a plurality of frequency bands comprising one or more frequency bins are determined by input processing the one or more input audio signals. The raw banded gains are to carry out one or more of reducing noise, reducing out-of-location signals, reducing echoes, perceptual domain-based leveling, perceptual domain-based dynamic range control, and perceptual domain-based dynamic equalization. The apparatus comprises a post-processor accepting the raw banded gains and applying post-processing to the raw banded gains to generate banded post-processed gains to apply to the one or more input signals. The post-processor includes a median filter to carry out median filtering of the raw banded gains. Generating by the post-processor of a particular post-processed gain for a particular frequency band includes the median filtering using gain values for frequency bands adjacent to the particular frequency band. The post-processing is according to one or more properties, including an end condition and a width for the median filtering. At least one property of the post-processing depends on signal classification of the one or more input audio signals.

One embodiment includes an apparatus to process one or more input audio signals. The apparatus comprises an input processor accepting the one or more input audio signals and input processing the one or more input audio signals to generate raw banded gains at a plurality of frequency bands comprising one or more frequency bins. The raw banded gains are to carry out one or more of reducing noise, reducing out-of-location signals, reducing echoes, perceptual domain-based leveling, perceptual domain-based dynamic range control, and perceptual domain-based dynamic equalization. The apparatus further comprises a post-processor accepting the raw banded gains and applying post-processing to the raw banded gains to generate banded post-processed gains to apply to the one or more input signals. The post-processor includes a median filter to carry out median filtering of the raw banded gains. Generating by the post-processor of a particular post-processed gain for a particular frequency band includes the median filtering using gain values for frequency bands adjacent to the particular frequency band. The post-processing is according to one or more properties, including an end condition and a width for the median filtering. At least one property of the post-processing depends on signal classification of the one or more input audio signals.

One embodiment includes a system for post-processing raw banded gains to generate banded post-processed gains for applying to an audio signal. The system comprises means for post-processing raw banded gains to generate banded post-processed gains, the raw banded gains determined by a means for input processing one or more input audio signals to generate the raw banded gains at a plurality of frequency bands comprising one or more frequency bins. The raw banded gains are to carry out one or more of reducing noise, reducing out-of-location signals, reducing echoes, perceptual domain-based leveling, perceptual domain-based dynamic range control, and perceptual domain-based dynamic equalization. The banded post-processed gains are for applying to the one or more audio signals. Generating a particular post-processed gain for a particular frequency band includes at least median filtering using gain values for frequency bands adjacent to the particular frequency band. The post-processing is according to one or more properties, including an end condition and a width for the median filtering. At least one property of the post-processing depends on signal classification of the one or more input audio signals.

One embodiment includes a system for processing one or more input audio signals. The system comprises means for input processing the one or more input audio signals to generate raw banded gains at a plurality of frequency bands comprising one or more frequency bins. The raw banded gains are to carry out one or more of reducing noise, reducing out-of-location signals, reducing echoes, perceptual domain-based leveling, perceptual domain-based dynamic range control, and perceptual domain-based dynamic equalization. The system further comprises means for post-processing raw banded gains to generate banded post-processed gains to apply to the one or more input audio signals to carry out the one or more of reducing noise, reducing out-of-location signals, reducing echoes, perceptual domain-based leveling, perceptual domain-based dynamic range control, and perceptual domain-based dynamic equalization. The generating by the means for post-processing of a particular post-processed gain for a particular frequency band includes at least median filtering using gain values for frequency bands adjacent to the particular frequency band. The post-processing applied by the means for post-processing is according to one or more properties, including an end condition and a width for the median filtering. At least one property of the post-processing depends on signal classification of the one or more input audio signals.

In some embodiments, the post-processing includes at least one of frequency-band-to-frequency-band smoothing and smoothing across time.

In some embodiments, one of or both the width and the end conditions of the median filtering depend on signal classification of the one or more input audio signals. In some embodiments, the classification includes whether the input audio signals are likely or not to be voice. In some embodiments, the classification includes whether the input audio signals are likely or not to be wind.

In some embodiments, the frequency bands are on a perceptual or logarithmic scale.

In some embodiments, the raw banded gains determined from one or more input audio signals are for reducing noise. In some embodiments, the raw banded gains are determined from more than one input audio signal and are for reducing noise and out-of-location signals. In some embodiments, the raw banded gains are determined from one or more input audio signals and one or more reference signals, and are for reducing noise and echoes.

One embodiment includes a tangible computer-readable storage medium comprising instructions that when executed by one or more processors of a processing system cause processing hardware to carry out a method of post-processing raw banded gains for applying to an audio signal as described herein.

One embodiment includes program logic that when executed by at least one processor causes carrying out a method as described herein.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

One aspect of the invention is processing of one or more input audio signals, including input processing to generate raw gains for noise reduction, or for other forms of input signal improvement. The processing includes applying post-processing to the raw gains, including median filtering of raw gains for gain smoothing. Another aspect of the invention is the post-processing that includes the median filtering of raw gains determined by input processing, e.g., for noise reduction or for other input processing. A median filter replaces a particular raw gain value with the median of a predefined number of raw gain values, e.g., by the median of the particular raw gain value and a predefined set of neighboring raw gain values. A median filter has one or more properties, e.g., the number of valued of which the median is determined, and the end conditions. At least one of the propertied may be data dependent. Therefore, in some examples described herein, there may be a first median filter for one type of data, e.g., data likely to be noise, and a different median filter for another type of data, e.g., data likely to be voice.

FIG. 1 shows one example of processing of a set of one or more input audio signals, e.g., microphone signals 101 from differently located microphones, including an embodiment of the present invention. The processing is by time frames of a number, e.g., M samples. In a simple embodiment, there is only one input, e.g., one microphone, and in another embodiment, there is a plurality, denoted P of inputs, e.g., microphone signals 101. An input processor 105 accepts sampled input audio signal(s) 101 and forms a banded instantaneous frequency domain amplitude metric 119 of the input audio signal(s) 101 for a plurality B of frequency bands. In some embodiments in which there is more than one input audio signal, the metric 119 is mixed-down from the input audio signal. The amplitude metric represents the spectral content. In many of the embodiments described herein, the spectral content is in terms of the power spectrum. However, the invention is not limited to processing power spectral values. Rather, any spectral amplitude dependent metric can be used. For example, if the amplitude spectrum is used directly, such spectral content is sometimes referred to as spectral envelope. Thus, the phrase "power (or other amplitude metric) spectrum" is sometimes used in the description.

In one noise reduction embodiment, the input processor 105 determines a set of raw banded gains 111 to apply to the instantaneous amplitude metric 119. In one embodiment the input processing further includes determining a signal classification of the input audio signal(s), e.g., an indication of whether the input audio signal(s) is/are likely to be voice or not as determined by a voice activity detector (VAD), and/or an indication of whether the input audio signal(s) is/are likely to be wind or not as determined by a wind activity detector (WAD), and/or an indication that the signal energy is rapidly changing as indicated, e.g., by the spectral flux exceeding a threshold.

A feature of embodiments of the present invention includes applying post-processing to the raw gains to improve the quality of the output. In one embodiment the post-processing includes median filtering of the raw gains determined by the input processing. A median filter considers a set of raw gains and outputs the gain that is the median of the set of raw gains. A set of B raw gains is determined every frame, so that there is a time sequence of sets of B raw gains over B frequency bands. In one embodiment, the median filter extends across frequency.

Figure 2:
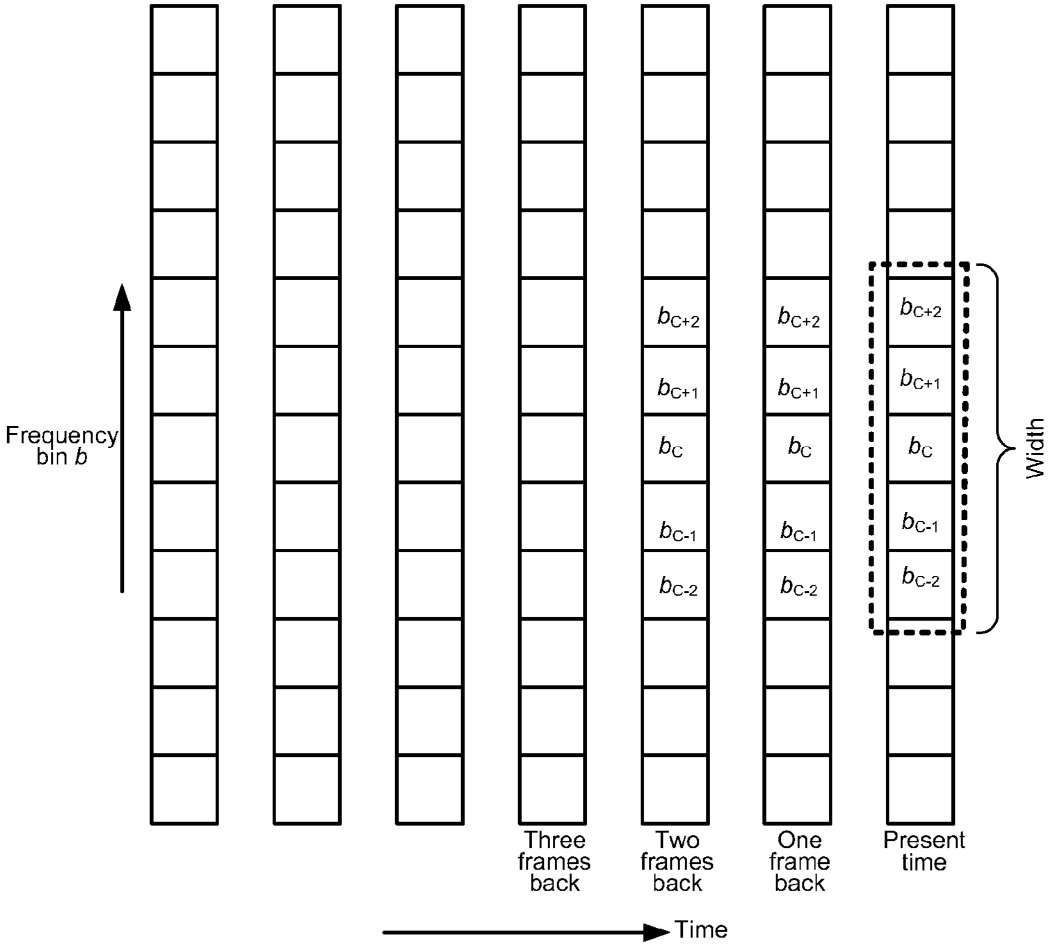
FIG. 2 shows diagrammatically sets of raw banded gains and the frequency coverage of one embodiment of a median filter of the present invention.

FIG. 2 shows diagrammatically sets of raw banded gains, one set for each of the present time, one frame back, two frames back, three frames back, etc., and further shows the coverage of an example median filter that includes five raw gain values centered around a frequency band $b_c$ in the present frame. By filter width we mean the width of the filter in the frequency band domain.

Returning to FIG. 1, the post-processing produces a set of post-processed gains 125 that are applied to the instantaneous power (or other amplitude metric) 119 to produce output, e.g., as a plurality of processed frequency bins 133. An output synthesis filterbank 135 (or for subsequent coding, a transformer/remapper) converts these frequency bins to desired output 137.

Input processing element 105 includes an input analysis filterbank, and a raw gain calculator. The input analysis filterbank, for the case of one input audio signal 101, includes a transformer to transform the samples of a frame into frequency bins, and a banding element to form frequency bands, most of which include a plurality of frequency bins. The input analysis filterbank, for the case of a plurality of input audio signals 101, includes a transformer to transform the samples of a frame of each of the input audio signals into frequency bins, a downmixer, e.g., a beamformer to downmix the plurality into a single signal, and a banding element to form frequency bands, most of which include a plurality of frequency bins.

In one embodiment, the transformer implements short time Fourier transform (STFT). For computational efficiency, the transformer uses a discrete finite length Fourier transform (DFT) implemented by a fast Fourier transform (FFT). Other embodiments use different transforms.

In one embodiment, the B bands are at frequencies whose spacing is monotonically non-decreasing. A reasonable number, e.g., 90% of the frequency bands include contribution from more than one frequency bin, and in particular embodiments, each frequency band includes contribution from two or more frequency bins. In some embodiments, the bands are monotonically increasing in a log-like manner. In some embodiments, the bands are on a psycho-acoustic scale, that is, the frequency bands are spaced with a scaling related to psycho-acoustic critical spacing, such banding called "perceptually-banding" herein. In particular embodiments, the band spacing is around 1 ERB or 0.5 Bark, or equivalent bands with frequency separation at around 10% of the center frequency. A reasonable range of frequency spacing is from 5-20% or approximately 0.5-2 ERB.

In some embodiments in which the input processing includes noise reduction, the input processing, a plurality of input audio signals are accepted by the input processor, and the input processing includes reducing out-of location signals. An example of input processing that includes reducing out-of location signals is described in concurrently filed International Application No. PCT/US2012/024370, titled COMBINED SUPPRESSION OF NOISE, ECHO, and OUT OF-LOCATION SIGNALS that also claims priority of U.S. Provisional Application No. 61/441,611 filed 10 Feb. 2011 to inventors Dickins et al. titled "COMBINED SUPPRESSION OF NOISE, ECHO, AND OUT-OF-LOCATION SIGNALS," the contents of both which are incorporated herein by reference. The resulting raw banded gains achieve simultaneous echo reduction and noise reduction.

In some embodiments in which the input processing includes noise reduction, the input processing also includes echo reduction. One example of input processing that includes echo reduction is described in concurrently filed International Application No. PCT/US2012/024370. For those embodiments in which the input processing includes echo reduction, one or more reference signals also are included and used to obtain an estimate of some property of the echo, e.g., of the power (or other amplitude metric) spectrum of the echo. The resulting raw banded gains achieve simultaneous echo reduction and noise reduction.

In some embodiments that include noise reduction and echo reduction, the post-processed gains are accepted by an element 123 that modifies the gains to include additional echo suppression. The result is a set of post-processed gains 125 that are applied to the input signal or signals. e.g., that are used to process, in the frequency domain, as frequency bins, the input audio signal if there is one input, or a downmix of the input audio signals if there is a plurality of input audio signals, e.g., from differently located microphones.

Gain application module 131 accepts the banded post-processed gains 125 and applies such gains to the input audio signal or signals. In one embodiment, the banded gains are interpolated and applied to the frequency bin data of the input audio signal (if one) or the downmixed input audio signal (if there is more than one input audio signal), denoted $Y_n$, n=0, 1, . . . , N−1, where N is the number of frequency bins. $Y_n$, n=0, 1, . . . , N−1 are the frequency bins of a frame of input audio signal samples $Y_m$, m=1, M. The processed data 133 may then be converted back to the sample domain by an output synthesis filterbank 135 to produce a frame of M signal samples 137. In some embodiments, in addition or instead, the signal 133 is subject to transformation or remapping, e.g., to a form ready for coding according to some coding method.

An example embodiment of a system similar to that of PCT/US2012/024370 that includes input processing to reduce noise (and possibly echo and out of location signals) is described in more detail below.

The invention, of course, is not limited to the input processing and gain calculation described in International Application No. PCT/US2012/024370, U.S. 61/441,611, or even to noise reduction.

While in one embodiment the input processing is to reduce noise (and possibly echo and out of location signals), in other embodiments, the input processing may be, additionally or primarily, to carry out one or more of perceptual domain-based leveling, perceptual domain-based dynamic range control, and perceptual domain-based dynamic equalization that take into account the variation in the perception of audio depending on the reproduction level of the audio signal, as described, for example, in commonly owned WO 2004111994. The raw banded gains calculated per WO 2004111994 are post-processed, including median filtering, to determine post-processed gains 125 to apply to the (transformed) input.

Post-Processing Including Median Filtering

Figure 3A:
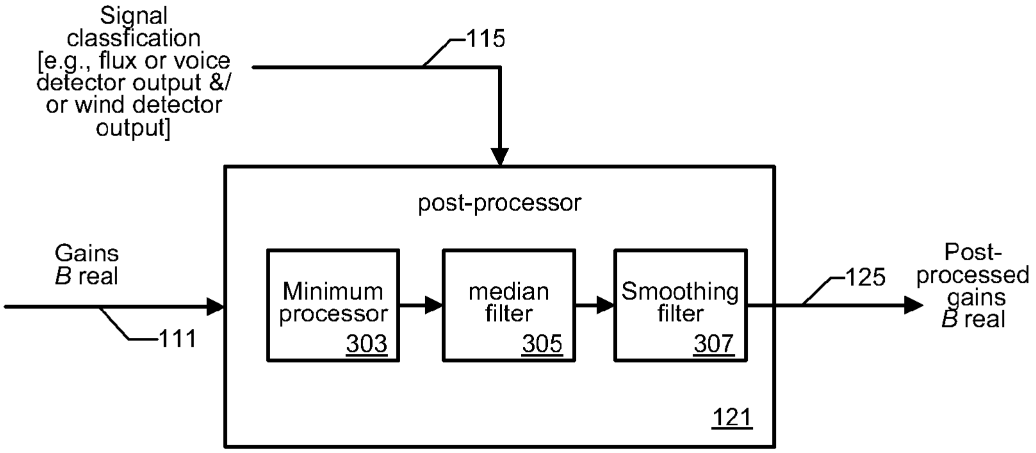
FIG. 3A shows a simplified block diagram of a post-processor that includes a median filter according to an embodiment of the present invention.
Figure 3B:
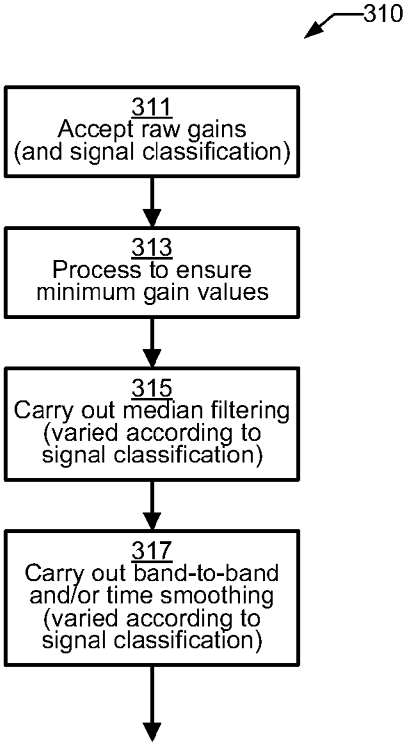
FIG. 3B shows a simplified flowchart of a method of post-processing that includes median filtering according to an embodiment of the present invention.

FIG. 3A shows a simplified block diagram of a post-processor 121 that includes a median filter 305 according to an embodiment of the present invention. The post-processor 121 accepts raw gains 111 and in embodiments in which the post-processing changes according to signal classification, one or more signal classification indicators 115, e.g., the outputs of one or more of a VAD and a WAD. While not included in all embodiments, some embodiments of the post-processor include a minimum gain processor 303 to ensure that the gains do not fall below a predefined, possibly frequency-dependent value. Again while not included in all embodiments, some embodiments of the post-processor include a smoothing filter 307 that processes the gains after median filtering to smooth frequency-band-to-frequency-band variations, and/or to smooth time variations. FIG. 3B shows a simplified flowchart of a method of post-processing 310 that includes in 311 accepting raw gains, and in embodiments in which the post-processing changes according to signal classification, one or more signal classification indicators 115. The post-processing includes median filtering 315 according to embodiments of the present invention. The inventors have found that median filtering is a powerful non-linear smoothing technique, which works well for eliminating undesired outliers when compared with only using a smoothing method. Some embodiments include in step 313 ensuring that the gains do not fall below a predefined minimum, which may be frequency band dependent. Some embodiments further include, in step 317, band-to-band and/or time smoothing, e.g., linear smoothing using, e.g., a weighted moving average.

Thus, in some embodiment of the present invention, a median filter 315 of raw banded gain values is characterized by: 1) the number of raw banded gains to include to determine the median value, 2) the frequency band positions of the raw banded gains that are included; 3) the edge conditions, i.e., the conditions used to extend the raw banded gains to allow calculation of the median at the edges of time and frequency band; and 4) how the characterization of the median filter is affected by the signal classification, e.g., one or more of the presence of voice and the presence of wind.

Some embodiments include a mechanism to control one or more of the median filtering characteristics over frequency and/or time based on signal classification. For example, in one embodiment that includes voice activity detection, one or more of the median filtering characteristics vary in accordance to whether the input is ascertained by a VAD to be voice or not. In one embodiment that includes wind activity detection, one or more of the median filtering characteristics vary in accordance to whether the input is ascertained by a WAD to be wind or not.

Examples of different edge conditions include (a) extrapolating of interior values for the edges; (b) using the minimum gain value to extend the raw banded gains at the edges, (c) using a zero gain value to extend the raw banded gains at the edges (d) duplicating the central filter position value to extend the raw banded gains at the edges, and (e) using a maximum gain value to extend the raw banded gains at the edges.

Additional Post-Processing

While not included in all embodiments, in some embodiments the post-processor 121 includes a minimum gain processor 303 that carries out step 313 to ensure the gains do not fall below a predefined minimum gain value. In some embodiments, the minimum gain processor ensures minimum values in a frequency-band dependent manner. In some embodiments, the manner of prevention minimum is dependent on the activity classification 115, e.g., whether voice or not.

In one embodiment, denoting the calculated raw gains from the input processing by $\text{Gain}'_{b,S}$, some alternatives for the gains denoted $\text{Gain}'_{b,RAW}$ after minimum processor are $$Gain'_{b,RAW} = Gain'_{b,MIN} + (1 - Gain'_{b,MIN}) \cdot Gain'_{b,S}$$

$$Gain'_{b,RAW} = Gain'_{b,MIN} + Gain'_{b,S}$$

$$Gain'_{b,RAW} = \begin{cases} Gain'_{b,MIN} & Gain'_{b,S} < Gain'_{b,MIN} \\ Gain'_{b,S} & \text{otherwise} \end{cases}$$

As one example, in some embodiments of post-processor 121 and step 310, the range of the maximum suppression depth or minimum gain may range from −80 dB to −5 dB and be frequency dependent. In one embodiment the suppression depth was around −20 dB at low frequencies below 200 Hz, varying to be around −10 dB at 1 kHz and relaxing to be only −6 dB at the upper voice frequencies around 4 kHz. Furthermore, in one embodiment, if a VAD determines the signal to be voice, $\text{Gain}'_{b,MIN}$ is increased, e.g., in a frequency-band dependent way (or in another embodiment, by the same amount for each band b). In one embodiment, the amount of increase in the minimum is larger in the mid-frequency bands, e.g., bands between 500 Hz to 2 kHz.

Furthermore, while not included in all embodiments, in some embodiments the post-processor 121 includes a smoothing filter 307, e.g., a linear smoothing filter that carries out one or both of frequency band-to-band smoothing and time smoothing. In some embodiments, such smoothing is varied according to signal classification 115.

One embodiment of smoothing 317 uses a weighted moving average with a fixed kernel. One example uses a binomial approximation of a Gaussian weighting kernel for the weighted moving average. As one example, a 5-point binomial smoother has a kernel 1/16[1 4 6 4 1]. In practice, of course, the factor 1/16 may be left out, with scaling carried out in one point or another as needed. As another example, a 3-point binomial smoother has a kernel 1/4[1 2 1]. Many other weighted moving average filters are known, and any such filter can suitably be modified to be used for the band-to-band smoothing of the gain.

In one embodiment, the band-to-band smoothing is controlled by the signal classification. In one embodiment, a VAD, e.g., a spatially-selective VAD is included, and if the VAD determines there is voice, the degree of smoothing is increased when noise is detected. In one example embodiment, 5-point band-to-band weighted average smoothing is carried out in the case the VAD indicates voice is detected, else, when the VAD determines there is no voice, no smoothing is carried out.

In some embodiments, time smoothing of the gains also is included. In some embodiments, the gain of each of the B bands is smoothed by a first order smoothing filter:

$$\text{Gain}_{b,Smoothed} = \alpha_b \text{GAIN}_b + (1-\alpha_b)\text{GAIN}_{b,Smoothed_{Prev}}$$

where $\text{Gain}_b$ is the current time-frame gain, $\text{Gain}_{b,Smoothed}$ is the time-smoothed gain, and $\text{Gain}_{b,Smoothed_{Prev}}$ is $\text{Gain}_{b,Smoothed}$ from the previous M-sample frame. $\alpha_b$ is a time constant which may be frequency band dependent and is typically in the range of 20 to 500 ms. In one embodiment a value of 50 ms was used. In one embodiment, the amount of time smoothing is controlled by the signal classification of the current frame. In a particular embodiment that includes first order time smoothing of the gains, the signal classification of the current frame is used to control the values of first order time constants used to filter the gains over time in each band. In the case a VAD is included, one embodiment stops time smoothing in the case voice is detected.

The inventors found it is important that aggressive smoothing be discontinued at the onset of voice. Thus it is preferable that the parameters of post-processing are controlled by the immediate signal classifier (VAD, WAD) value that has low latency and is able to achieve a rapid transition of the post-processing from noise into voice (or other desired signal) mode. The speed with which more aggressive post-processing is reinstated after detection of voice, i.e., at the trail out, has been found to be less important, as it affects intelligibility of voice to a lesser extent.

An Example of Voice Activity Control

In one embodiment, the band-to-band median filtering is controlled by the signal classification. In one embodiment, a VAD is included, and if the VAD determines it is likely that there is no voice, a 7 point T-shaped median filter with 5-point band-to-band and 3-point time median filtering is carried out, with edge processing including extending minimum gain values or a zero value at the edges to compute the median value. If the VAD determines it is likely that voice is present, in a first version, a 5-point T-shaped time-frequency median filtering is carried out with three frequency bands in the current time frame, and using two previous time frames, and in a second embodiment, a three point memoryless frequency-band only median filter, with the edge values extrapolated at the edges to calculate the median, is used. In one such set of embodiments, the median value is the median value, such that the median filter is a median filter.

An Example of Wind Activity Control

One feature of the present invention is that the post-processing, e.g., the median filtering depends on the classification of the signal, and one such classification, in some embodiments, is whether there is wind or not. In some embodiments, a WAD is included, and if the WAD determines there is no wind, and a VAD indicates there is no voice, fewer raw gain values are included in the median filter. When WAD and a VAD is included, if the WAD determines there is likely not to be wind and the VAD determines voice is likely, the median filtering should be shorter, e.g., by using 3-point band-to-band median filter, with extrapolating the edge values applied at the edges. If the WAD indicated wind is unlikely, and the VAD indicates voice is also unlikely, more median filtering can be used, e.g., 5-point band-to-band median filtering is carried out, with edge processing including extending minimum gain values or a zero value at the edges to compute the median value. If the WAD indicated wind is likely, and the VAD indicates voice is unlikely, even more median filtering can be used, e.g., a 7-point band-to-band median filtering can be carried out, with edge processing including extending minimum gain values or a zero value at the edges to compute the median value.

An Example Acoustic Noise Reduction System

An acoustic noise reduction system typically includes a noise estimator and a raw gain calculation module to determine a set of noise reduction gains that are determined, for example, on a set of frequency bands, and applied to the (noisy) input audio signal after transformation to the frequency domain and banding to the set of frequency bands to attenuate noise components. The acoustic noise reduction system may include one microphone, or a plurality of inputs from differently located microphones and downmixing, e.g., beamforming to generate one input audio signal. The acoustic noise reduction system may further include echo reduction, and may further include out-of-location signal reduction.

Figure 4:
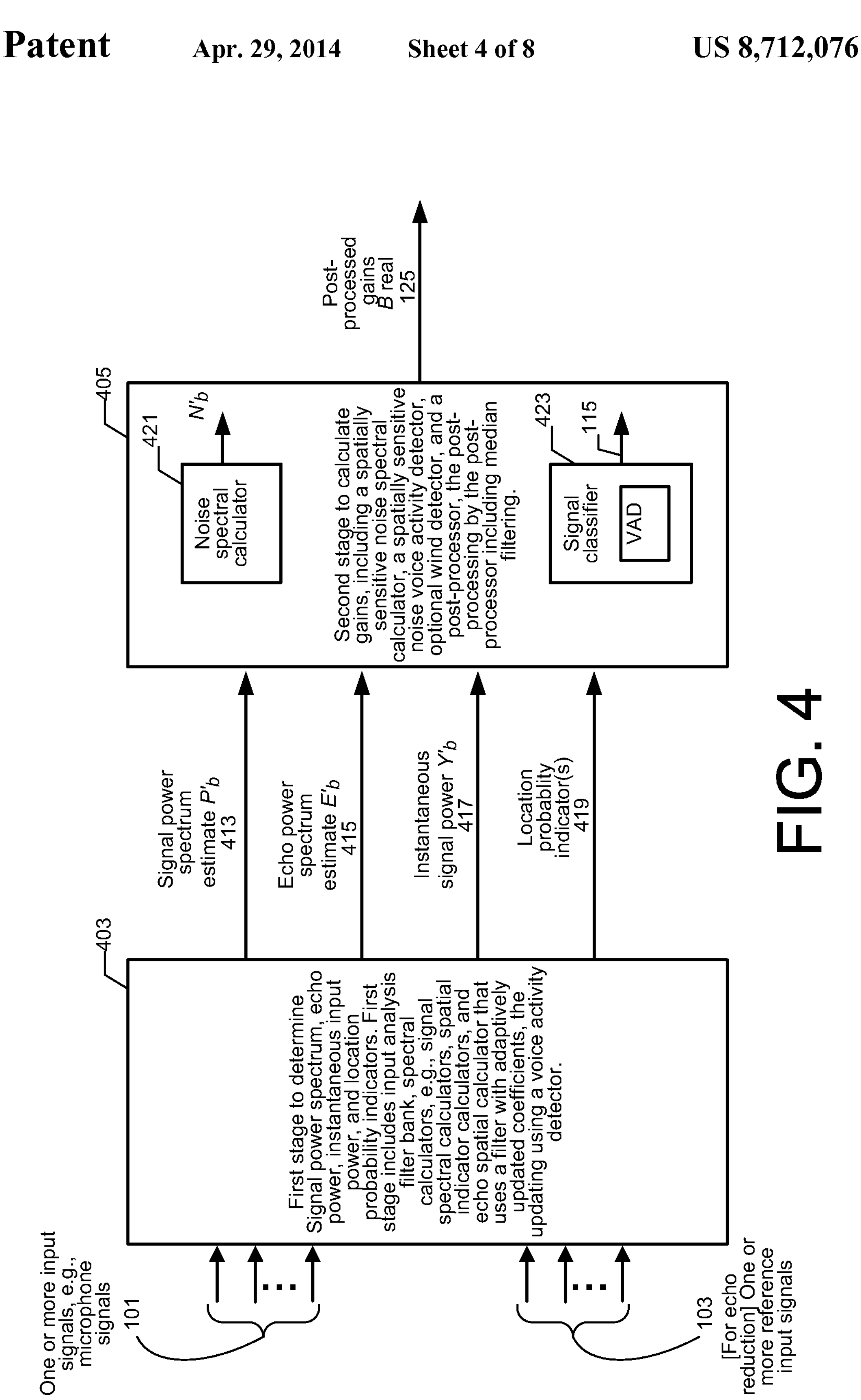
FIG. 4 shows one example of an apparatus embodiment configured to determine a set of post-processed gains for suppression of noise, and in some versions, simultaneous echo suppression, and in some versions, simultaneous suppression of out-of-location signals.

FIG. 4 shows one example of an apparatus configured to determine a set of post-processed gains for suppression of noise, and in some versions, simultaneous echo suppression, and in some versions, simultaneous suppression of out-of-location signals. Such a system is described, e.g., in International Application PCT/US2012/024370 and in U.S. 61/441,611. The inputs include a set of one or more input audio signals 101, e.g., signals from differently located microphones, each in sets of M samples per frame. When spatial information is included, there are two or more input audio signals, e.g., signals from spatially separated microphones. When echo suppression is included, one or more reference signals 103 are also accepted, e.g., in frames of M samples. These may be, for example, one or more signals from one or more loudspeakers, or, in another embodiment, the signal(s) that are used to drive the loudspeaker(s). A first input processing stage 403 determines a banded signal power (or other amplitude metric) spectrum 413 denoted $P'_b$, and a banded measure of the instantaneous power 417 denoted $Y'_b$. When more than one input audio signal is included, each of the spectrum 413 and instantaneous banded measure 417 is of the inputs after being mixed down by a downmixer, e.g., a beamformer. When echo suppression is included, the first input processing stage 403 also determines a banded power spectrum estimate of the echo 415, denoted $E'_b$, the determining being from a previously calculated power spectrum estimates of the echo using a filter with a set of adaptively determined filter coefficients. In those versions that include out-of-location signal suppression, the first input processing stage 403 also determines spatial features 419 in the form of banded location probability indicators 419 that are usable to spatially separate a signal into the components originating from the desired location and those not from the desired direction.

The quantities from the first stage 403 are used in a second stage 405 that determines raw gains, and that post-processes the raw gains, including the median filtering of embodiments of the present invention, to determine the banded post-processed gains 125. Embodiments of the second stage 405 include a noise power (or other amplitude metric) spectrum calculator 421 to determine a measure of the noise power (or other amplitude metric) spectrum, denoted $E'_b$, and a signal classifier 423 to determine a signal classification 115, e.g., one or more of a voice activity detector (VAD), a wind activity detector, and a power flux calculator. FIG. 4 shows the signal classifier 423 including a VAD.

Figure 5:
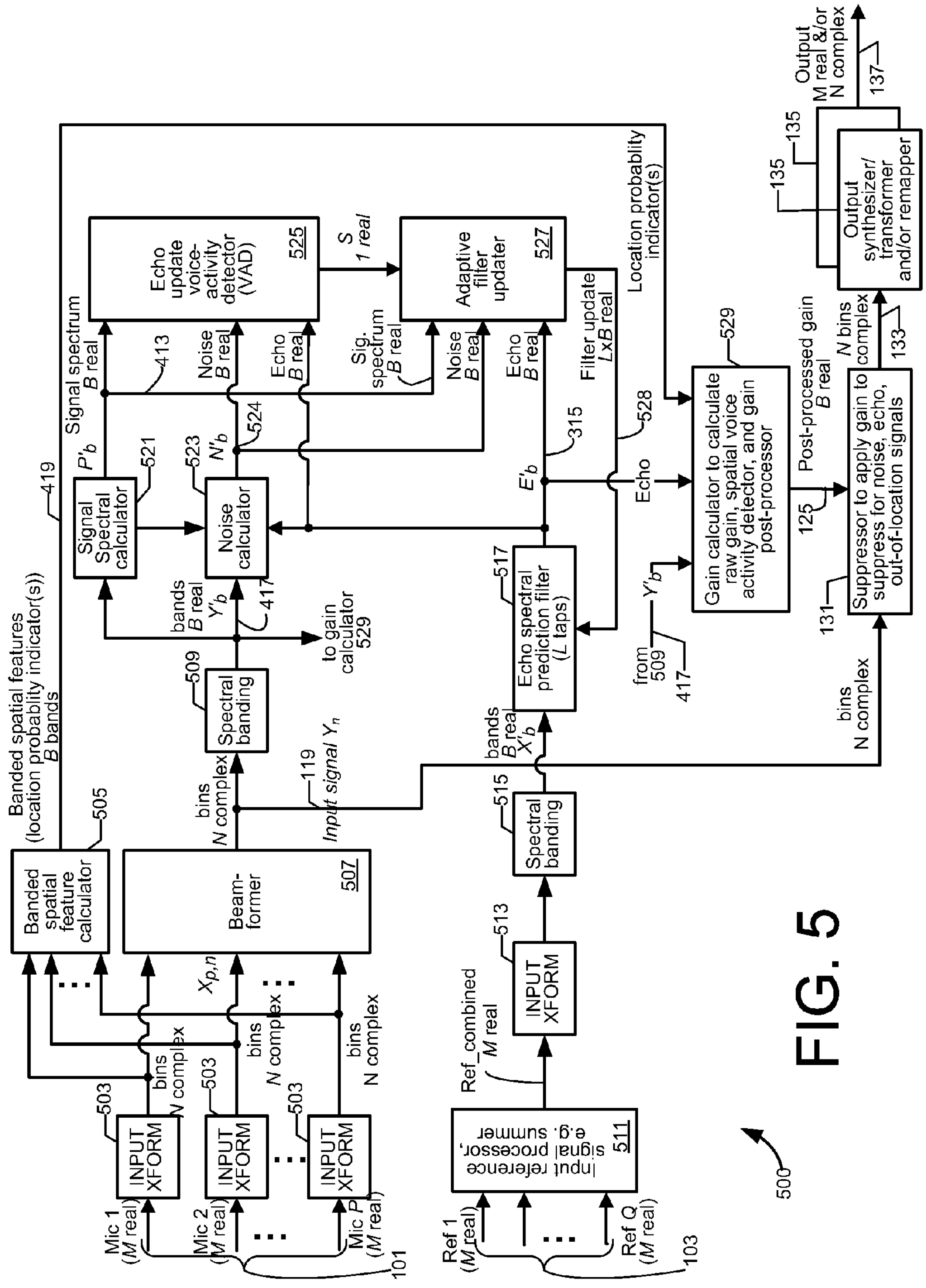
FIG. 5 shows one example of an apparatus embodiment in more detail.

FIG. 5 shows one embodiment 500 of the elements of FIG. 4 in more detail, and includes, for the example embodiment of noise, echo, and out-of-location noise suppression, the suppressor 131 that applied the post-processed gains 125 and the output synthesizer (or transformer or remapper) 135 to generate the output signal 137.

Comparing FIGS. 4 and 5, the first stage processor 403 of FIG. 4 includes elements 503, 505, 507, 509, 511, 513, 515, 517, 521, 523, 525, and 527 of FIG. 5. In more detail, the input(s) frame(s) 101 are transformed by inputs transformer(s) 503 to determine transformed input signal bins, the number of frequency bins denoted by N. In the case of more than one input audio signal, these frequency domain signals are beamformed by a beamformer 507 to form input frequency bin data denoted $Y_n$, n=1, . . . , N, and the input frequency bin data $Y_n$ is banded by spectral banding element 509 into B spectral bands, in one embodiment, perceptually spaced spectral bands to produce the instantaneous banded measure of the power $Y'_b$, b=1, . . . , B. In a version that includes out-of-location suppression and more than one input audio signal, the frequency domain signals from the input transformers 503 are accepted by a banded spatial feature calculator to determine banded location probability indictors, each between 0 and 1. In a version that includes echo suppression, if there is more than one reference signal, say Q reference signals, the signals are combines by combiner 511, in one embodiment a summer, to produce a combined reference input. An input transformer 513 and spectral bander 515 convert the reference into banded reference spectral content denoted $X'_b$, b=1, . . . , B for the B bands. An L-tap linear prediction filter 517 predicts the banded echo spectral content $E'_b$, b=1, . . . , B, using L times B filter update coefficients 528. A signal spectral calculator 521 calculates a measure of the (mixed-down) power (or other amplitude metric) spectrum $P'_b$, b=1, . . . , B. In some embodiments, $Y'_b$ is used as a good-enough approximation to $P'_b$.

The L B filter coefficients for filter 517 are determined by an adaptive filter updater 527 that uses the current banded echo spectral content $E'_b$, the measure of the (mixed-down) power (or other amplitude metric) spectrum $P'_b$, a banded noise power (or other amplitude metric) spectrum 524 denoted $N'_b$, b=1, . . . , B, and determined by a noise calculator 523 from the instantaneous power $Y'_b$ and a measure from the signal spectral calculator 521. The updating is triggered by a voice activity signal denoted S as determined by a voice activity detector (VAD) 525 using $P'_b$ (or $Y'_b$), $N'_b$, and $E'_b$. When S exceeds a threshold, the signal is assumed to be voice. The VAD derived in the echo update voice-activity detector 525 and filter updater 527 serves the specific purpose of controlling the adaptation of the echo prediction. A VAD or detector with this purpose is often referred to as a double talk detector. In one embodiment, the echo filter coefficient updating of updater 527 is gated, with updating occurring when the expected echo is significant compared to the expected noise and current input power, as determined by the VAD 525 and indicated by a low value of local signal activity S.

Details of how the elements the first stage 403 per FIGS. 4 and 5 operate in some embodiments are as follows. In one embodiment, the input transformers 503, 511 determine the short time Fourier transform (STFT). In another embodiment, the following transform and inverse pair is used for the forward transform in elements 503 and 511, and in output synthesis element 135.

$$X_{2n} = \frac{1}{\sqrt{N}} \sum_{n'=0}^{N-1} e^{\frac{-i\pi n'}{2N}} (u_{n'} x_{n'} - i u_{N+n'} x_{N+n'}) e^{\frac{-i2\pi nn'}{N}}$$

$$n = 0 \ \ldots \ N/2 - 1$$

$$X_{2n+1} = \frac{1}{\sqrt{N}} \sum_{n'=0}^{N-1} e^{\frac{-i\pi n'}{2N}} (u_{n'} x_{n'} + i u_{N+n'} x_{N+n'}) e^{\frac{-i2\pi nn'}{N}}$$

$$n = 0 \ \ldots \ N/2 - 1$$

$$y_n = v_n \mathrm{real}\left[\frac{1}{\sqrt{N}} e^{\frac{i\pi n}{4N}} \left( \sum_{n'=0}^{N/2-1} X_{n'} e^{\frac{i4\pi nn'}{N}} + \sum_{n'=N/2}^{N-1} \overline{X_{N-n'-1}} e^{\frac{i4\pi nn'}{N}} \right)\right]$$

$$n = 0 \ \ldots \ N - 1$$

$$y_{N+n} = -v_{N+n} imag\left[\frac{1}{\sqrt{N}} e^{\frac{i\pi n}{4N}} \left( \sum_{n'=0}^{N/2-1} X_{n'} e^{\frac{i4\pi nn'}{N}} + \sum_{n'=N/2}^{N-1} \overline{X_{N-n'-1}} e^{\frac{i4\pi nn'}{N}} \right)\right]$$

$$n = 0 \ \ldots \ N - 1$$

where $i^2=-1$, $u_n$ and $v_n$ are appropriate window functions, $x_n$ represents the last 2N input samples with $x_{N-1}$ representing the most recent sample, $X_n$ represents the N complex-valued frequency bins in increasing frequency order. The inverse transform or synthesis is represented in the last two equation lines. $y_n$ represents the 2N output samples that result from the individual inverse transform prior to overlapping, adding and discarding as appropriate for the designed windows. It should be noted, that this transform has an efficient implementation as a block multiply and FFT. Note that the use of $x_n$ and $X_n$ in the above expressions of transform is for convenience. In other parts of this disclosure, $X_n$, n=0, . . . , N−1, denote the frequency bins of the signal representative of the reference signals, and $Y_n$, n=0, . . . , N−1, denote the frequency bins of the mixed-down input audio signals.

In one embodiment, the window functions $u_n$ and $v_n$ for the above transform in one embodiment is the sinusoidal window family, of which one suggested embodiment is $$u_n = v_n = \sin\left(\frac{n + \frac{1}{2}}{2N}\pi\right)$$

$$n = 0 \ \ldots \ 2N - 1.$$

It should be apparent to one skilled in the art that the analysis and synthesis windows, also known as prototype filters, can be of length greater or smaller than the examples given herein.

While the invention works with any mixed-down signal, in some embodiments, the downmixer is a beamformer 507 designed to achieve some spatial selectivity towards the desired position. In one embodiment, the beamformer 507 is a linear time invariant process, i.e., a passive beamformer defined in general by a set of complex-valued frequency-dependent gains for each input channel. For the example of a two-microphone array, with the desired sound source located broad side to the array, i.e., at the perpendicular bisector, one embodiment uses for beamformer 507 a passive beamformer 107 that determines the simple sum of the two input channels. In some versions, beamformer 507 weights the sets of inputs (as frequency bins) by a set of complex valued weights. In one embodiment, the beamforming weights of beamformer 107 are determined according to maximum-ratio combining (MRC). In another embodiment, the beamformer 507 uses weights determined using zero-forcing. Such methods are well known in the art.

The banding of spectral banding elements 509 and 514 can be described by $$Y'_b = W_b \sum_{n=0}^{N-1} w_{b,n} |Y_n|^2$$

where $Y'_b$ is the banded instantaneous power of the mixed-down, e.g., beamformed signal, $W_b$ is the normalization gain and $w_{b,n}$ are elements from a banding matrix.

The signal spectral calculator 521 in one embodiment is described by a smoothing process $$P'_b = \alpha_{P,b}(Y'_b + Y'_{min}) + (1 - \alpha_{P,b}) P'_{b_{PREV}}$$

where $P'_{b_{PREV}}$ is a previously, e.g., the most recently determined signal power (or other frequency domain amplitude metric) estimate, $\alpha_{P,b}$ is a time signal estimate time constant, and $Y'_{min}$ is an offset. A suitable range for the signal estimate time constant $\alpha_{P,b}$ was found to be between 20 to 200 ms. In one embodiment, the offset $Y'_{min}$ is added to avoid a zero level power spectrum (or other amplitude metric spectrum) estimate. $Y'_{min}$ can be measured, or can be selected based on a priori knowledge. $Y'_{min}$, for example, can be related to the threshold of hearing or the device noise threshold.

In one embodiment, the adaptive filter 517 includes determining the instantaneous echo power spectrum (or other amplitude metric spectrum), denoted $T'_b$ for band b by using an L tap adaptive filter described by $$T'_b = \sum_{l=0}^{L-1} F_{b,l} X'_{b,l},$$

where the present frame is $X'_b = X'_{b,0}$, where $X'_{b,0}, \ldots, X'_{b,l}, \ldots X'_{b,L-1}$ are the L most recent frames of the (combined) banded reference signal $X'_b$, including the present frame $X'_b = X'_{b,0}$, and where the L filter coefficients for a given band b are denoted by $F_{b,0}, \ldots, F_{b,l}, \ldots F_{b,L-1}$, respectively.

One embodiment includes time smoothing of the instantaneous echo from echo prediction filter 517 to determine the echo spectral estimate $E'_b$. In one embodiment, a first order time smoothing filter is used as follows $$E'_b = T'_b \text{ for } T'_b \geq E'_{b_{Prev}},$$

and $$E'_b = \alpha_{E,b} T'_b + (1-\alpha_{E,b}) E'_{b_{Prev}} \text{ for } T'_b < E'_{b_{Prev}}$$

where $E'_{b_{Prev}}$ is the previously determined echo spectral estimate, e.g., in the most recently, or other previously determined estimate, and $\alpha_{E,b}$ is a first order smoothing time constant.

In one embodiment, the noise power spectrum calculator 523 uses a minimum follower with exponential growth:

$$N'_b = \min(P'_b, (1+\alpha_{N,b}) N'_{b_{Prev}}) \text{ when } E'_b \text{ is less than } N'_{b_{Prev}}$$

$$N'_b = N'_{b_{Prev}} \text{ otherwise,}$$

where $\alpha_{N,b}$ is a parameter that specifies the rate over time at which the minimum follower can increase to track any increase in the noise. In one embodiment, the criterion $E'_b$ is less than $N'_{b_{Prev}}$ is if $E'_b < N'_{b_{Prev}}/2$, i.e., in the case that the (smoothed) echo spectral estimate $E'_b$ is less than the previous value of $N'_b$ less 3 dB, in which case the noise estimate follows the growth or current power. Otherwise, $N'_b = N'b_{Prev}$, i.e., $N'_b$ is held at the previous value of $N'_b$. The parameter $\alpha_{N,b}$ is best expressed in terms of the rate over time at which minimum follower will track. That rate can be expressed in dB/sec, which then provides a mechanism for determining the value of $\alpha_{N,b}$. The range is 1 to 30 dB/sec. In one embodiment, a value of 20 dB/sec is used.

In other embodiments, different approaches for noise estimation may be used. Examples of such different approached include but are not limited to alternate methods of determining a minimum over a window of signal observation, e.g., a window of 1 and 10 seconds. In addition or alternate to the minimum, such different approaches might also determine the mean and variance of the signal during times that it is classified as likely to be noise or that voice is unlikely.

In one embodiment, the one or more leak rate parameters of the minimum follower are controlled by the probability of voice being present as determined by voice activity detecting (VAD). In one embodiment, VAD element 525 determines an overall signal activity level denoted S as $$S = \sum_{b=1}^{B} \frac{\max(0, Y'_b - \beta_N N'_b - \beta_E E'_b)}{Y'_b + Y'_{sens}}$$

where $\beta_N$, $\beta_B > 1$ are margins for noise end echo, respectively and $Y'_{sens}$ is a settable sensitivity offset. These parameters may in general vary across the bands. In one embodiment, the values of $\beta_N$, $\beta_E$ are between 1 and 4. In a particular embodiment, $\beta_N$, $\beta_E$ are each 2. $Y'_{sens}$ is set to be around expected microphone and system noise level, obtained by experiments on typical components. Alternatively, one can use the threshold of hearing to determine a value for $Y_{sens}$.

In one embodiment, the echo filter coefficient updating of updater 527 is gated, as follows. If the local signal activity level is low, e.g., below a pre-defined threshold $S_{thresh}$, i.e., if $S < S_{thresh}$, then the adaptive filter coefficients are updated as:

$$F_{b,l} = F_{b,l} + \mu \frac{(\max(0, Y'_b - \gamma_N N'_b) - T'_b) X'_{b,l}}{\sum_{l''=0}^{L-1} (X'^{\,2}_{b,l''} + X'^{\,2}_{sens})} \text{ if } S < S_{thresh},$$

where $\gamma_N$ is a tuning parameter tuned to ensure stability between the noise and echo estimate. A typical value for $\gamma_N$ is 1.4 (+3 dB). A range of values 1 to 4 can be used. $\mu$ is a tuning parameter that affects the rate of convergence and stability of the echo estimate. Values between 0 and 1 might be useful in different embodiments. In one embodiment, $\mu=0.1$ independent of the frame size M. $X'_{sens}$ is set to avoid unstable adaptation for small reference signals. In one embodiment $X'_{sens}$ is related to the threshold of hearing. The choice of value for $S_{thresh}$ depends on the number of bands. $S_{thresh}$ is between 1 and B, and for one embodiment having 24 bands to 8 kHz, a suitable range was found to be between 2 and 8, with a particular embodiment using a value of 4.

Embodiments of the present invention use spatial information in the form of one or more measures determined from one or more spatial features in a band b that are monotonic with the probability that the particular band b has such energy incident from a spatial region of interest. Such quantities are called spatial probability indicators. In one embodiment, the one or more spatial probability indicators are functions of one or more banded weighted covariance matrices of the input audio signals. Given the output of the P input transforms $X_{p,n}$, p=1, ... P, with N frequency bins, n=0, ..., N−1, we construct a set of weighted covariance matrices to correspond by summing the product of the input vector across the P inputs for bin n with its conjugate transpose, and weighting by a banding matrix $W_b$ with elements $w_{b,n}$ $$R'_b = \sum_{n=0}^{N-1} w_{b,n} [X_{1,n} \ \ldots \ X_{P,n}]^H [X_{1,n} \ \ldots \ X_{P,n}].$$

The $w_{b,n}$ provide an indication of how each bin is weighted for contribution to the bands. In some embodiments, the one or more covariance matrices are smoothed over time. In some embodiments, the banding matrix includes time dependent weighting for a weighted moving average, denoted as $W_{b,l}$ with elements $w_{b,n,l}$, where l represents the time frame, so that, over L time frames, $$R'_b = \sum_{n=0}^{N-1}\sum_{l=0}^{L-1} w_{b,n,l}[X_{1,n} \ \ldots \ X_{P,n}]^H [X_{1,n} \ \ldots \ X_{P,n}].$$

In the case of two inputs, P=2, define $$R'_b = \begin{bmatrix} R'_{b11} & R'_{b12} \\ R'_{b21} & R'_{b22} \end{bmatrix},$$

so that each band covariance matrix $R'_b$ is a 2×2 Hermetian positive definite matrix with $R'_{b21}=\overline{R'_{b12}}$, where the overbar is used to indicate the complex conjugate.

Denote by the spatial feature "ratio" a quantity that is monotonic with the ratio of the banded magnitudes $$\frac{R'_{b11}}{R'_{b22}}.$$

In one embodiment, a log relationship is used:

$$Ratio'_b = 10\log_{10}\frac{R'_{b11}+\sigma}{R'_{b22}+\sigma}$$

where σ is a small offset added to avoid singularities. σ can be thought of as the smallest expected value for $R'_{b11}$. In one embodiment, it is the determined, or estimated (a priori) value of the noise power (or other frequency domain amplitude metric) in band b for the microphone and related electronics. That is, the minimum sensitivity of any preprocessing used.

Denote by the spatial feature phase a quantity monotonic with $\tan^{-1} R'_{b21}$.

$$\text{Phase}'_b = \tan^{-1} R'_{b21}.$$

Denote by the spatial feature "coherence" a quantity that is monotonic with $$\frac{R'_{b21}R'_{b12}}{R'_{b11}R'_{b22}}.$$

In some embodiments, related measures of coherence could be used such as $$\frac{2R'_{b21}R'_{b12}}{R'_{b11}R'_{b11} + R'_{b22}R'_{b22}}$$

or values related to the conditioning, rank or eigenvalue spread of the covariance matrix. In one embodiment, the coherence feature is $$Coherence'_b = \sqrt{\frac{R'_{b21}R'_{b12}+\sigma^2}{R'_{b11}R'_{b22}+\sigma^2}}.$$

with offset σ as defined above.

One feature of some embodiments of the noise, echo and out-of-location signal suppression is that, based on the a priori expected or current estimate of the desired signal features—the target values, e.g., representing spatial location, gathered from statistical data—each spatial feature in each band can be used to create a probability indicator for the feature for the band b.

In one embodiment, the distributions of the expected spatial features for the desired location are modeled as Gaussian distributions that present a robust way of capturing the region of interest for probability indicators derived from each spatial feature and band.

Three spatial probability indicators are related to these three spatial features, and are the ratio probability indicator, denoted $RPI'_b$, the phase probability indicator, denoted $PPI'_b$, and the coherence probability indicator, denoted $CPI'_b$, with $$RPI'_b = f_{R_b}(\text{Ratio}'_b - \text{Ratio}_{target_b}) = f_{R_b}(\Delta\text{Ratio}'_b),$$

where $\Delta\text{Ratio}'_b = \text{Ratio}'_b - \text{Ratio}_{target_b}$ and $\text{Ratio}_{target_b}$ is determined from either prior estimates or experiments on the equipment used, e.g., headsets, e.g., from data such as shown in FIG. 9A.

The function $f_{R_b}(\Delta\text{Ratio}')$ is a smooth function. In one embodiment, the ratio probability indicator function is $$f_{R_b}(\Delta Ratio') = \exp\left[-\frac{\Delta Ratio'_b}{Width_{Ratio,b}}\right]^2,$$

where $\text{Width}_{Ratio,b}$ is a width tuning parameter expressed in log units, e.g., dB. The $\text{Width}_{Ratio,b}$ is related to but does not need to be determined from actual data. It is set to cover the expected variation of the spatial feature in normal and noisy conditions, but also needs only be as narrow as is required in the context of the overall system to achieve the desired suppression.

For the phase probability indicator, $$PPI'_b = f_{P_b}(\text{Phase}'_b - \text{Phase}_{target_b}) = f_{R_b}(\Delta\text{Phase}'_b),$$

where $\Delta\text{Phase}'_b = \text{Phase}'_b - \text{Phase}_{target_b}$ and $\text{Phase}_{target_b}$ is determined from either prior estimates or experiments on the equipment used, e.g., headsets, obtained, e.g., from data.

The function $f_{P_b}(\Delta\text{Phase}')$ is a smooth function. In one embodiment, $$f_{R_b}(\Delta Phase'_b) = \exp\left[-\frac{\Delta phase'_b}{Width_{phase,b}}\right]^2$$

where $\text{Width}_{Phase,b}$ is a width tuning parameter expressed in units of phase. In one embodiment, $\text{Width}_{Phase,b}$ is related to but does not need to be determined from actual data.

For the Coherence probability indicator, no target is used, and in one embodiment, $$CPI'_b = \left(\frac{R'_{b21}R'_{b12}+\sigma^2}{R'_{b11}R'_{b22}+\sigma^2}\right)^{CFactor_b}$$

where $\text{CFactor}_b$ is a tuning parameter that may be a constant value in the range of 0.1 to 10; in one embodiment, a value of 0.25 was found to be effective.

Figure 6:
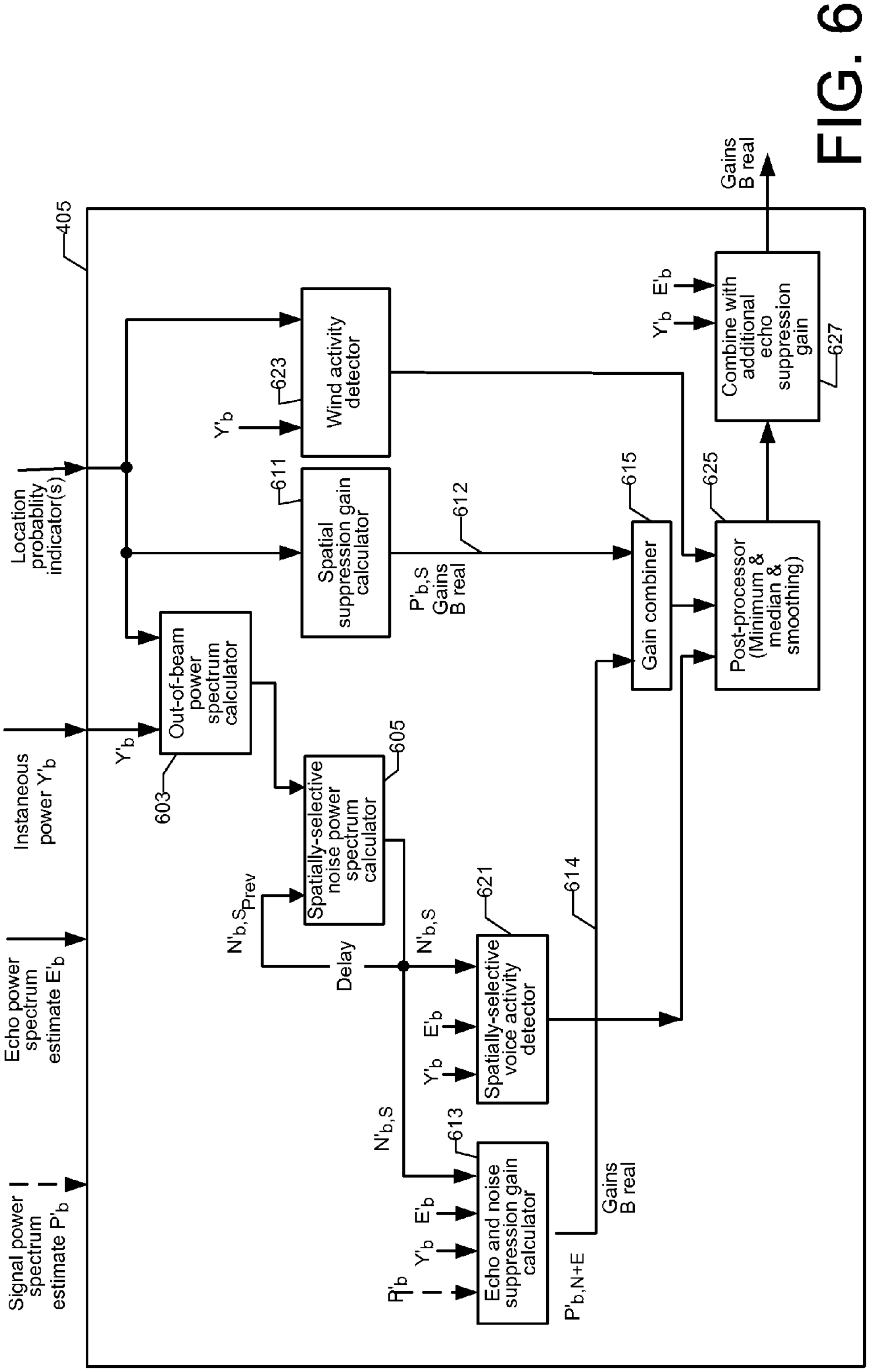
FIG. 6 shows an example embodiment of a gain calculation element that includes a spatially sensitive voice activity detector and a wind activity detector.

FIG. 6 shows one example of the calculation in element 529 of the raw gains, and includes a spatially sensitive voice activity detector (VAD) 621, and a wind activity detector (WAD) 623. Alternate versions of noise reduction may not include the WAD, or the spatially sensitive VAD, and further may not include echo suppression or other reduction. Furthermore, the embodiment shown in FIG. 6 includes additional echo suppression, which may not be included in simpler versions.

In one embodiment, the spatial probability indicators are used to determine what is referred to as the beam gain, a statistical quantity denoted $\text{BeamGain}'_b$ that can be used to estimate the in-beam and out-of-beam power from the total power, e.g., using an out-of-beam spectrum calculator 603, and further, can be used to determine the out-of-beam suppression gain by a spatial suppression gain calculator 611. By convention and in the embodiments presented herein, the probability indicators are scaled such that the beam gain has a maximum value of 1.

In one embodiment, the beam gain is $$\text{BeamGain}'_b=\text{BeamGain}_{min}+(1-\text{BeamGain}_{min})\,RPI'_b\cdot PPI'_b\cdot CPI'_b.$$

Some embodiments use $\text{BeamGain}_{min}$ of 0.01 to 0.3 (−40 dB to −10 dB). One embodiment uses a $\text{BeamGain}_{min}$ of 0.1.

The in-beam and out-of beam powers are:

$$\text{Power}'_{b,InBeam}=\text{BeamGain}'^{2}_{b}Y'_b$$

$$\text{Power}'_{b,OutOfBeam}=(1-\text{BeamGain}'^{2}_{b})Y'_b$$

Note that $\text{Power}'_{b,InBeam}$ and $\text{Power}'_{b,OutOfBeam}$ are statistical measures used for suppression.

In one version of element 603, $$\text{Power}'_{b,OutOfBeam}=[0.1+0.9(1-\text{BeamGain}_b^{2})]Y'_b.$$

One version of gain calculation uses a spatially-selective noise power spectrum calculator 605 that determines an estimate of the noise power (or other metric of the amplitude) spectrum. One embodiment of the invention uses a leaky minimum follower, with a tracking rate determined by at least one leak rate parameter. The leak rate parameter need not be the same as for the non-spatially-selective noise estimation used in the echo coefficient updating. Denote by $N'_{b,S}$ the spatially-selective noise spectrum estimate. In one embodiment, $$N'_{b,S}=\min(\text{Power}'_{b,OutOfBeam},(1+\alpha_b)N'_{b,S_{Prev}}),$$

where $N'_{b,S_{Prev}}$ is the already determined, i.e., previous value of $N'_{b,S}$. The leak rate parameter $\alpha_b$ is expressed in dB/s such that for a frame time denoted T, $(1+\alpha_b)1/T$ is between 1.2 and 4 if the probability of voice is low, and 1 if the probability of voice is high. A nominal value of $\alpha_b$ is 3 dB/s such that $(1+\alpha_b)1/T=1.4$.

In some embodiments, in order to avoid adding bias to the noise estimate, echo gating is used, i.e., $$N'_{b,S}=\min(\text{Power}'_{b,OutOfBeam},(1+\alpha_b)N'_{b,S_{Prev}})\quad \text{if } N'_{b,S_{Prev}}>2E'_b,$$

else $$N'_{b,S}=N'_{b,S_{Prev}}.$$

That is, the noise estimate is updated only if the previous noise estimate suggests the noise level is greater, e.g., greater than twice the current echo prediction. Otherwise the echo would bias the noise estimate.

One feature of the noise reducer shown in FIGS. 4, 5 and 6 includes simultaneously suppressing: 1) noise based on a spatially-selective noise estimate, and 2) out-of-beam signals. The gain calculator 529 includes an element 613 to calculates a probability indicator 614, expressed as a gain for the intermediate signal, e.g., the frequency bins $Y_n$ based on the spatially-selective estimates of the noise power (or other frequency domain amplitude metric) spectrum, and further on the instantaneous banded input power $Y'_b$ in a particular band. For simplicity this probability indicator 614 is referred to as a gain, denoted $\text{Gain}_N$. It should be noted however that this gain $\text{Gain}_N$ is not directly applied, but rather combined with additional gains, i.e., additional probability indicators in a gain combiner 615 to achieve a single gain to apply to achieve a single suppressive action.

The element 613 is shown with echo suppression, and in some versions does not include echo suppression.

An expression found to be effective in terms of computational complexity and effect is given by $$Gain'_N=\left(\frac{\max(0,\,Y'_b-\beta'_N N_{b,S})}{Y'_b}\right)^{GainExp}$$

where $Y'_b$ is the instantaneous banded power (or other frequency domain amplitude metric), $N'_{b,S}$ is the banded spatially-selective (out-of-beam) noise estimate, and $\beta'_N$ is a scaling parameter, typically in the range of 1 to 4. In one version, $\beta'_N=1.5$. The parameter GainExp is a control of the aggressiveness or rate of transition of the suppression gain from suppression to transmission. This exponent generally takes a value in the range of 0.25 to 4. In one version, GainExp=2.

Adding Echo Suppression

Some embodiments of input processing for noise reduction include not only noise suppression, but also simultaneous suppression of echo. In some embodiments of gain calculator 529, element 613 includes echo suppression and in gain calculator 529, the probability indicator 614 for suppressing echoes is expressed as a gain denoted $\text{Gain}'_{b,N+E}$. The above noise suppression gain expression, in the case of also including echo suppression, becomes $$Gain'_{b,N+E}=\left(\frac{\max(0,\,Y'_b-\beta'_N N'_{b,S}-\beta'_E E'_b)}{Y'_b}\right)^{GainExp_b}\qquad(\text{"Gain 1"})$$

where $Y'_b$ is again the instantaneous banded power, $N'_{b,S}$, $E'_b$ are the banded spatially-selective noise and banded echo estimates, and $\beta'_N$, $\beta'_E$ are scaling parameters in the range of 1 to 4, to allow for error in the noise and echo estimates and to offset the gain curve accordingly. Again, they are similar in purpose and magnitude to the constants used in the VAD function, though they are not necessarily the same value. In one embodiment suitable tuned values are $\beta'_N=1.5$, $\beta'_E=1.4$, $GainExp_b 2$ for all values of b.

Several of the expressions for $\text{Gain}'_{N+E}$ described herein have the instantaneous banded input power (or other frequency domain amplitude metric) $Y'_b$ in both the numerator and denominator. This works well when the banding is properly designed as described herein, with log-like or perceptually spaced frequency bands. In alternate embodiments of the invention, the denominator uses the estimated banded power spectrum (or other amplitude metric spectrum) $P'_b$, so that the above expression for $Gain'_{b,N+E}$ changes to:

$$Gain'_{b,N+E} = \left(\frac{\max(0, Y'_b - \beta'_N N'_{b,S} - \beta'_E E'_b)}{P'_b}\right)^{GainExp}. \quad (\text{"Gain } 1_{MOD}\text{"})$$

Additional Independent Control of Echo Suppression

The suppression gain expressions above can be generalized as functions on the domain of the ratio of the instantaneous input power to the expected undesirable signal power, sometimes called "noise" for simplicity. In these gain expressions, the undesirable signal power is the sum of the estimated (location-sensitive) noise power and predicted or estimated echo power. Combining the noise and echo together in this way provides a single probability indicator in the form of a suppressive gain that causes simultaneous attenuation of both undesirable noise and of undesirable echo.

In some cases, e.g., in cases in which the echo can achieve a level substantially higher than the level of the noise, such suppression may not lead to sufficient echo attenuation. For example, in some applications, there may be a need for only mild reduction of the ambient noise, whilst it is generally required that any echo be suppressed below audibility. To achieve such a desired effect, in one embodiment, an additional scaling of the probability indicator or gain is used, such additional scaling based on the ratio of input audio signal to echo power alone.

Denote by $f_A(\bullet)$, $f_B(\bullet)$ a pair of suppression gain functions, each having desired properties for suppression gains, e.g., as described above, including, for example being smooth. As one example, each of $f_A(\bullet)$, $f_B(\bullet)$ has sigmoid function characteristics. In some embodiments, rather than the gain expression being defined as $$f_A\left(\frac{Y'_b}{N'_{b,S} + E'_b}\right),$$

one can instead use a pair of probability indicators, e.g., gains $$f_A\left(\frac{Y'_b}{N'_{b,S}}\right),$$
$$f_B\left(\frac{Y'_b}{E'_b}\right)$$

and determine a combined gain factor from $$f_A\left(\frac{Y'_b}{N'_{b,S}}\right)$$
and
$$f_B\left(\frac{Y'_b}{E'_b}\right),$$

which allows for independent control of the aggressiveness and depth for the response to noise and echo signal power. In yet another embodiment, $$f_A\left(\frac{Y'_b}{N'_{b,S} + E'_b}\right)$$

can be applied for both noise and echo suppression, and $$f_B\left(\frac{Y'_b}{E'_b}\right)$$

can be applied for additional echo suppression.

In one embodiment the two functions $$f_A\left(\frac{Y'_b}{N'_{b,S}}\right),$$
$$f_B\left(\frac{Y'_b}{E'_b}\right),$$

or in another embodiment, the two functions $$f_A\left(\frac{Y'_b}{N'_{b,S} + E'_b}\right),$$
$$f_B\left(\frac{Y'_b}{E'_b}\right)$$

are combined as a product to achieve a combined probability indicator, as a suppression gain.

Combining the Suppression Gains for Simultaneous Suppression of Out-Of-Location Signals In one embodiment, the suppression probability indicator for in-beam signals, expressed as a beam gain 612, called the spatial suppression gain, and denoted $Gain'_{b,S}$ is determined by a spatial suppression gain calculator 611 in element 529 (FIG. 5) as $$Gain'_{b,S} = BeamGain'_b = BeamGain_{min} + (1 - BeamGain_{min}) RPI'_b \cdot PPI'_b \cdot CPI'_b.$$

The spatial suppression gain 612 is combined with other suppression gains in gain combiner 615 to form an overall probability indicator expressed as a suppression gain. The overall probability indicator for simultaneous suppression of noise, echo, and out-of-beam signals, expressed as a gain $Gain'_{b,RAW}$, is in one embodiment the product of the gains:

$$Gain'_{b,RAW} = Gain'_{b,S} \cdot Gain'_{b,N+E}.$$

In an alternate embodiment, additional smoothing is applied. In one example embodiment of the gain element 615:

$$Gain'_{b,RAW} = 0.1 + 0.9 Gain'_{b,S} \cdot Gain'_{b,N+E}.$$

where the minimum gain 0.1 and 0.9=(1−0.1) factors can be varied for different embodiments to achieve a different minimum value for the gain, with a suggested range of 0.001 to 0.3 (−60 dB to −10 dB).

The above expression for $Gain'_{b,RAW}$ suppresses noise and echo equally. As discussed above, it may be desirable to not eliminate noise completely, but to completely eliminate echo. In one such embodiment of gain determination, $$Gain'_{b,RAW} = 0.1 + 0.9Gain'_{b,S} \cdot f_A\left(\frac{Y'_b}{N'_{b,S} + E'_b}\right) \cdot f_B\left(\frac{Y'_b}{E'_b}\right),$$

where $$f_A\left(\frac{Y'_b}{N'_{b,S} + E'_b}\right)$$

where achieves (relatively) modest suppression of both noise and echo, while $$f_B\left(\frac{Y'_b}{E'_b}\right)$$

suppresses the echo more. In a different embodiment, $f_A(\bullet)$ suppresses only noise, and $f_B(\bullet)$ suppresses the echo.

In yet another embodiment, $$\text{Gain}'_{b,RAW} = 0.1 + 0.9\text{Gain}'_{b,S} \cdot \text{Gain}'_{b,N+E},$$

where:

$$Gain'_{b,E+B} = \left(0.1 + 0.9 f_A\left(\frac{Y'_b}{N'_{b,S} + E'_b}\right)\right) \cdot \left(0.1 + 0.9 f_B\left(\frac{Y'_b}{E'_b}\right)\right).$$

In some embodiments, this noise and echo suppression gain is combined with the spatial feature probability indicator or gain for forming a raw combined gain, and then post-processed by a post-processor 625 and by the post processing step to ensure stability and other desired behavior.

In another embodiment, the gain function $$f_B\left(\frac{Y'_b}{E'_b}\right)$$

specific to the echo suppression is applied as a gain after post-processing by post-processor 625. Some embodiments of gain calculator 529 include a determiner of the additional echo suppression gain and a combiner 627 of the additional echo suppression gain with the post-processed gain to result in the overall B gains to apply. The inventors discovered that such an embodiment can provide a more specific and deeper attenuation of echo, since the echo probability indicator or gain $$f_B\left(\frac{Y'_b}{E'_b}\right)$$

is not subject to the smoothing and continuity imposed by the post-processing.

Figure 7:
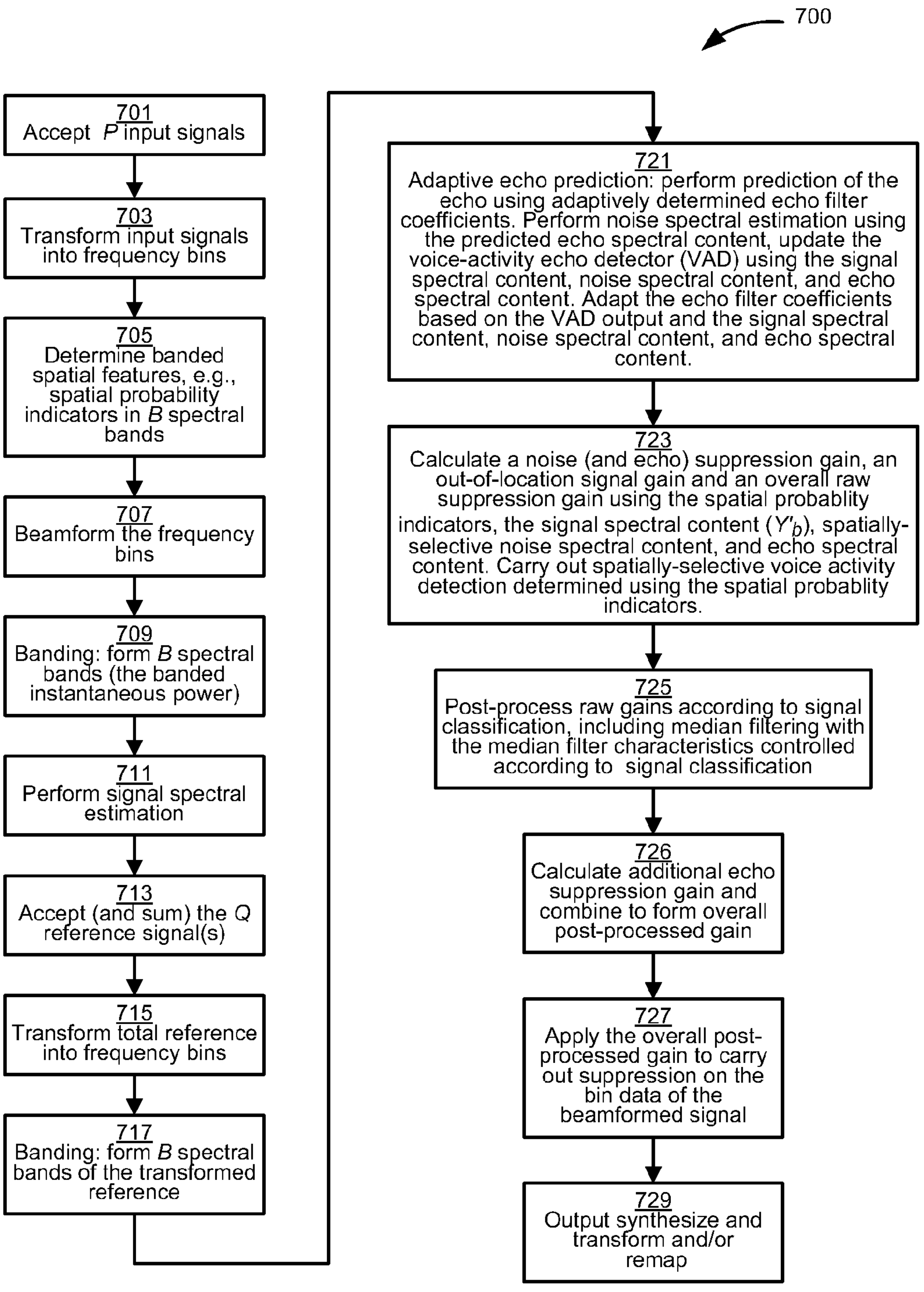
FIG. 7 shows a flowchart of an embodiment of a method of operating a processing apparatus to suppress noise and out-of-location signals and, in some embodiments, echoes.

FIG. 7 shows a flowchart of a method 700 of operating a processing apparatus 100 to suppress noise and out-of-location signals and in some embodiments echo in a number P≥1 of signal inputs 101, e.g., from differently located microphones. In embodiments that include echo suppression, method 700 includes processing a Q≥1 reference inputs 102, e.g., Q inputs to be rendered on Q loudspeakers, or signals obtained from Q loudspeakers.

In one embodiment, method 700 comprises: accepting 701 in the processing apparatus a plurality of sampled input audio signals 101, and forming 703, 707, 709 a mixed-down banded instantaneous frequency domain amplitude metric 417 of the input audio signals 101 for a plurality of frequency bands, the forming including transforming 703 into complex-valued frequency domain values for a set of frequency bins. In one embodiment, the forming includes in 703 transforming the input audio signals to frequency bins, downmixing, e.g., beamforming 707 the frequency data, and in 709 banding. In 711, the method includes calculating the power (or other amplitude metric) spectrum of the signal. In alternate embodiments, the downmixing can be before transforming, so that a single mixed-down signal is transformed. In alternate embodiments, the system may make use of an estimate of the banded echo reference, or a similar representation of the frequency domain spectrum of the echo reference provided by another processing component or source within the realized system.

The method includes determining in 705 banded spatial features, e.g., location probability indicators 419 from the plurality of sampled input audio signals.

In embodiments that include simultaneous echo suppression, the method includes accepting 713 one or more reference signals and forming in 715 and 717 a banded frequency domain amplitude metric representation of the one or more reference signals. The representation in one embodiment is the sum. Again in embodiments that include echo suppression, the method includes predicting in 721 a banded frequency domain amplitude metric representation of the echo 415 using adaptively determined echo filter coefficients. The predicting in one embodiment further includes voice-activity detecting—VAD—using the estimate of the banded spectral amplitude metric of the mixed-down signal 413, the estimate of banded spectral amplitude metric of noise, and the previously predicted echo spectral content 415. The coefficients are updated or not according to the results of voice-activity detecting. Updating uses an estimate of the banded spectral amplitude metric of the noise, previously predicted echo spectral content 415, and an estimate of the banded spectral amplitude metric of the mixed-down signal 413. The estimate of the banded spectral amplitude metric of the mixed-down signal is in one embodiment the mixed-down banded instantaneous frequency domain amplitude metric 417 of the input audio signals, while in other embodiments, signal spectral estimation is used.

In some embodiments, the method 700 includes: a) calculating in 723 raw suppression gains including an out-of-location signal gain determined using two or more of the spatial features 419, and a noise suppression gain determined using spatially-selective noise spectral content; and b) combining the raw suppression gains to a first combined gain for each band. The noise suppression gain in some embodiments includes suppression of echoes, and its calculating 723 also uses the predicted echo spectral content 415.

In some embodiments, the method 700 further includes in 725 carrying out spatially-selective voice activity detection determined using two or more of the spatial features 419 to generate a signal classification, e.g., whether voice or not. In some embodiments, wind detection is used such that the signal classification further includes whether the signal is wind or not.

The method 700 further includes carrying out post-processing on the first combined gains of the bands to generate a post-processed gain 125 for each band. In some embodiments, the post-processing includes ensuring minimum gain, e.g., in a band dependent manner. One feature of embodiments of the present invention is that the post-processing includes carrying out median filtering of the combined gains, e.g., to ensure there are no outlier gains. Some embodiments of post-processing include ensuring smoothness by carrying out time and/or band-to-band smoothing.

In some embodiments, the post-processing 725 is according to the signal classification, e.g., whether voice or not, or whether wind or not, and in some embodiments, the characteristics of the median filtering vary according to the signal classification, e.g., whether voice or not, or whether wind or not.

In one embodiment in which echo suppression is included, the method includes calculating in 726 an additional echo suppression gain. In one embodiment, the additional echo suppression gain is included in the first combined gain which is used as a final gain for each band, and in another embodiment, the additional echo suppression gain is combined with the results of applying post-processing to the first combined gain to generate a final gain for each band.

The method includes applying in 727 the final gain, including interpolating the gain for bin data to carry out suppression on the bin data of the mixed-down signal to form suppressed signal data 133, and applying in 729 one or both of a) output synthesis and transforming to generate output samples, and b) output remapping to generate output frequency bins.

Typically, P≥2 and Q≥1. However, the methods, systems, and apparatuses disclosed herein can scale down to remain effective for the simpler cases of P=1, Q≥1 and P≥2, Q=0. The methods and apparatuses disclosed herein even work reasonably well for P=1, Q=0. Although this final example is a reduced and perhaps trivial embodiment of the presented invention, it is noted that the ability of the proposed framework to scale is advantageous, and furthermore the lower signal operation case may be required in practice should one or more of the input audio signals or reference signals become corrupted or unavailable, e.g. due to the failure of a sensor or microphone.

Whilst the disclosure is presented for a complete noise reduction method (FIG. 7), system or apparatus (FIGS. 5, 6,) that includes all aspects of suppression, including simultaneous echo, noise, and out-of-spatial-location suppression, or presented as a computer-readable storage medium that includes instructions that when executed by one or more processors of a processing system (see FIG. 8 described below), cause a processing apparatus that includes the processing system to carry out the method such as that of FIG. 7, note that the example embodiments also provide a scalable solution for simpler applications and situations. Furthermore, noise reduction is only one example of input processing that determines gains that can be post-processed by the post-processing method that includes median filtering described in embodiments of the present invention.

A Processing System-Based Apparatus

Figure 8:
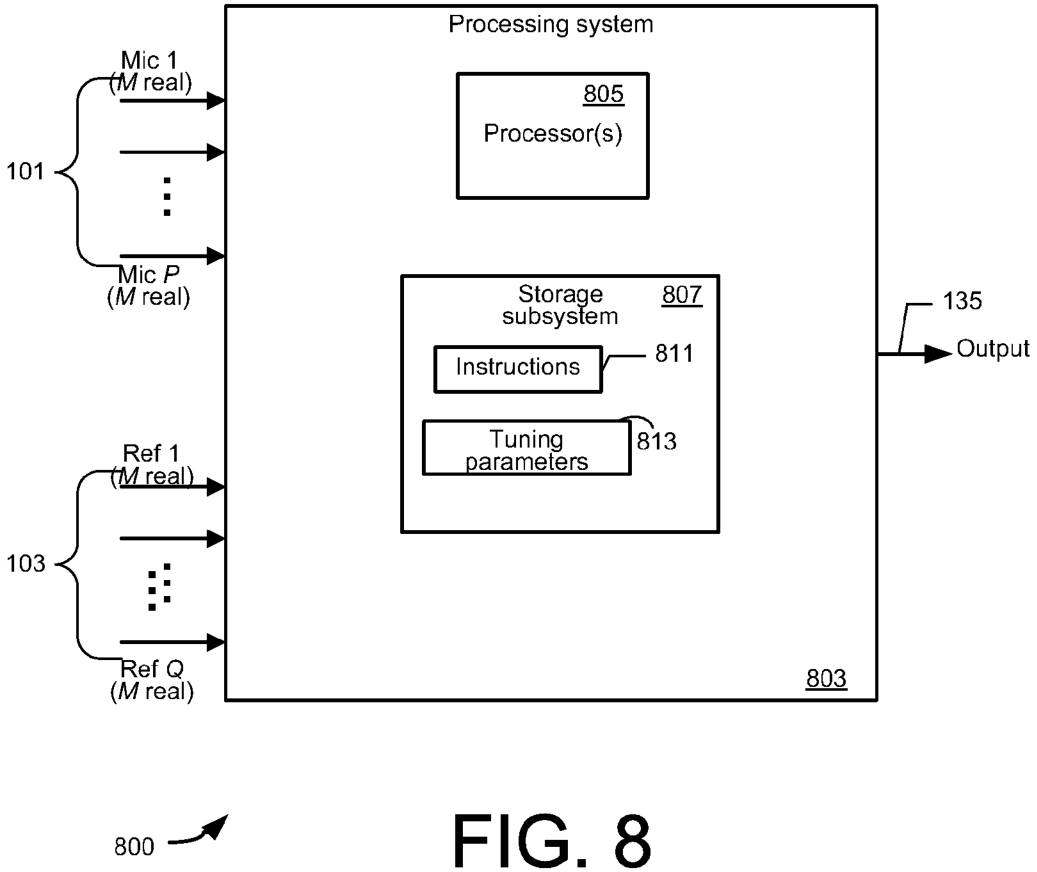
FIG. 8 shows a simplified block diagram of a processing apparatus embodiment for processing one or more audio inputs to determine a set of raw gains, to post-process the raw gains including median filtering the determined raw gains, and to generate audio output that has been modified by application of the post-processed gains.

FIG. 8 shows a simplified block diagram of one processing apparatus embodiment 800 for processing one or more of audio inputs 101, e.g., from microphones (not shown). The processing apparatus 800 is to determine a set of gains, to post-process the gains including median filtering the determined gains, and to generate audio output 137 that has been modified by application of the gains. One version achieves one or more of perceptual domain-based leveling, perceptual domain-based dynamic range control, and perceptual domain-based dynamic equalization that takes into account the variation in the perception of audio depending on the reproduction level of the audio signal. Another version achieved noise reduction.

One noise reduction version includes echo reduction, and in such a version, the processing apparatus also accepts one or more reference signals 103, e.g., from one or more loudspeakers (not shown) or from the feed(s) to such loudspeaker(s). In one such noise reduction version, the processing apparatus 800 is to generate audio output 137 that has been modified by suppressing, in one embodiment noise and out-of-location signals, and in another embodiment also echoes as specified in accordance to one or more features of the present invention. The apparatus, for example, can implement the system shown in FIG. 6, and any alternates thereof, and can carry out, when operating, the method of FIG. 7 including any variations of the method described herein. Such an apparatus may be included, for example, in a headphone set such as a Bluetooth headset. The audio inputs 101, the reference input(s) 103 and the audio output 137 are assumed to be in the form of frames of M samples of sampled data. In the case of analog input, a digitizer including an analog-to-digital converter and quantizer would be present. For audio playback, a de-quantizer and a digital-to-analog converter would be present. Such and other elements that might be included in a complete audio processing system, e.g., a headset device are left out, and how to include such elements would be clear to one skilled in the art.

The embodiment shown in FIG. 8 includes a processing system 803 that is configured in operation to carry out the suppression methods described herein. The processing system 803 includes at least one processor 805, which can be the processing unit(s) of a digital signal processing device, or a CPU of a more general purpose processing device. The processing system 803 also includes a storage subsystem 807 typically including one or more memory elements. The elements of the processing system are coupled, e.g., by a bus subsystem or some other interconnection mechanism not shown in FIG. 8. Some of the elements of processing system 803 may be integrated into a single circuit, using techniques commonly known to one skilled in the art.

The storage subsystem 807 includes instructions 811 that when executed by the processor(s) 805, cause carrying out of the methods described herein.

In some embodiments, the storage subsystem 807 is configured to store one or more tuning parameters 813 that can be used to vary some of the processing steps carried out by the processing system 803.

The system shown in FIG. 8 can be incorporated in a specialized device such as a headset, e.g., a wireless Bluetooth headset. The system also can be part of a general purpose computer, e.g., a personal computer configured to process audio signals.

Voice Activity Detection with Settable Sensitivity

In some embodiments of the invention, the post-processing, e.g., the median filtering is controlled by signal classification as determined by a VAD. The invention is not limited to any particular type of VAD, and many VADs are known in the art. When applied to suppression, the inventors have discovered that suppression works best when different parts of the suppression system are controlled by different VADs, each such VAD custom designed for the functions of the suppressor in which it is used in, rather than having an "optimal" VAD for all uses. Therefore, in some versions of the input processing for noise reduction, a plurality of VADs, each controlled by a small set of tuning parameters that separately control sensitivity and selectivity, including spatial selectivity, such parameters tuned according to the suppression elements in which the VAD is used. Each of the plurality of the VADs is an instantiation of a universal VAD that determines indications of voice activity from $Y'_b$. The universal VAD is controlled by a set of parameters and uses an estimate of noise spectral content, the banded frequency domain amplitude metric representation of the echo, and the banded spatial features. The set of parameters includes whether the estimate of noise spectral content is spatially selective or not. The type of indication of voice activity that a particular instantiation determines is controlled by a selection of the parameters.

One embodiment of a general spatially-selective VAD structure—the universal VAD to calculate voice activity that can be tuned for various functions—is $$S = \sum_{b=1}^{B} (BeamGain'_b)^{BeamGainExp}\left(\frac{\max(0,\ Y'_b - \beta_{b_N}\cdot(N'_b \vee N'_{b,S}) - \beta_{b_E}E'_b)}{Y'_b + Y'_{b_{sens}}}\right),$$

where $BeamGain'_b = BeamGain_{min} + (1 - BeamGain_{min})$ $RPI'_b \cdot PPI'_b \cdot CPI'_b$, BeamGainExp is a parameter that for larger values increases the aggressiveness of the spatial selectivity of the VAD, and is 0 for a non-spatially-selective VAD, $N'_b \vee N'_{b,S}$ denotes either the total noise power (or other frequency domain amplitude metric) estimate $N'_b$, or the spatially-selective noise estimate $N'_{b,S}$ determined using the out-of-beam power (or other frequency domain amplitude metric), $\beta_N$, $\beta_E > 1$ are margins for noise end echo, respectively and $Y'_{sens}$ is a settable sensitivity offset. The values of $\beta_N$, $\beta_E$ are between 1 and 4. BeamGainExp is between 0.5 to 2.0 when spatial selectivity is desired, and is 1.5 for one embodiment of a spatially-selective VAD, e.g., used to control post-processing in some embodiments of the invention. $RPI'_b$, $PPI'_b$, and $CPI'_b$ are, as above, three spatial probability indicators, namely the ratio probability indicator, the phase probability indicator, and the coherence probability indicator.

The above expression also controls the operation of the universal voice activity detecting method.

For any given set of parameters to generate the voice indicator value S a binary decision or classifier can be obtained by considering the test $S > S_{thresh}$ as indicating the presence of voice. It should also be apparent that the value S can be used as a continuous indicator of the instantaneous voice level. Furthermore, an improved useful universal VAD for operations such as transmission control or controlling the post processing could be obtained using a suitable "hang over" or period of continued indication of voice after a detected event. Such a hang over period may vary from 0 to 500 ms, and in one embodiment a value of 200 ms was used. During the hang over period, it can be useful to reduce the activation threshold, for example by a factor of ⅔. This creates increased sensitivity to voice and stability once a talk burst has commenced.

For spatially-selective voice activity detection to control one or more post-processing operations, e.g., for a spatially-selective VAD, the noise in the above expression is $N'_{b,S}$ determined using an out-of-beam estimate of power (or other frequency domain amplitude metric). $Y_{sens}$ is set to be around expected microphone and system noise level, obtained by experiments on typical components.

General

Unless specifically stated otherwise, it is appreciated that throughout the specification discussions using terms such as "generating," "processing," "computing," "calculating," "determining" or the like, may refer to, without limitation, the action and/or processes of hardware, e.g., an electronic circuit, a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of such steps is implied, unless specifically stated.

The methodologies described herein are, in some embodiments, performable by one or more processors that accept logic, instructions encoded on one or more computer-readable media. When executed by one or more of the processors, the instructions cause carrying out at least one of the methods described herein. Any processor capable of executing a set of instructions (sequential or otherwise) that specify actions to be taken is included. Thus, one example is a typical processing system that includes one or more processors. Each processor may include one or more of a CPU or similar element, a graphics processing unit (GPU), field-programmable gate array, application-specific integrated circuit, and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device, and a network interface device.

In some embodiments, a non-transitory computer-readable medium is configured with, e.g., encoded with instructions, e.g., logic that when executed by one or more processors of a processing system such as a digital signal processing device or subsystem that includes at least one processor element and a storage subsystem, cause carrying out a method as described herein. Some embodiments are in the form of the logic itself. A non-transitory computer-readable medium is any computer-readable medium that is not specifically a transitory propagated signal or a transitory carrier wave or some other transitory transmission medium. The term "non-transitory computer-readable medium" thus covers any tangible computer-readable storage medium. Non-transitory computer-readable media include any tangible computer-read-able storage media and may take many forms including non-volatile storage media and volatile storage media. Non-volatile storage media include, for example, static RAM, optical disks, magnetic disks, and magneto-optical disks. Volatile storage media includes dynamic memory, such as main memory in a processing system, and hardware registers in a processing system. In a typical processing system as described above, the storage subsystem thus a computer-readable storage medium that is configured with, e.g., encoded with instructions, e.g., logic, e.g., software that when executed by one or more processors, causes carrying out one or more of the method steps described herein. The software may reside in the hard disk, or may also reside, completely or at least partially, within the memory, e.g., RAM and/or within the processor registers during execution thereof by the computer system. Thus, the memory and the processor registers also constitute a non-transitory computer-readable medium on which can be encoded instructions to cause, when executed, carrying out method steps.

While the computer-readable medium is shown in an example embodiment to be a single medium, the term "medium" should be taken to include a single medium or multiple media (e.g., several memories, a centralized or distributed database, and/or associated caches and servers) that store the one or more sets of instructions.

Furthermore, a non-transitory computer-readable medium, e.g., a computer-readable storage medium may form a computer program product, or be included in a computer program product.

In alternative embodiments, the one or more processors operate as a standalone device or may be connected, e.g., networked to other processor(s), in a networked deployment, or the one or more processors may operate in the capacity of a server or a client machine in server-client network environment, or as a peer machine in a peer-to-peer or distributed network environment. The term processing system encompasses all such possibilities, unless explicitly excluded herein. The one or more processors may form a personal computer (PC), a media playback device, a headset device, a hands-free communication device, a tablet PC, a set-top box (STB), a personal digital assistant (PDA), a game machine, a cellular telephone, a Web appliance, a network router, switch or bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, as will be appreciated by those skilled in the art, embodiments of the present invention may be embodied as a method, an apparatus such as a special purpose apparatus, an apparatus such as a data processing system, logic, e.g., embodied in a non-transitory computer-readable medium, or a computer-readable medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., a computer program on a computer-readable storage medium, or the computer-readable storage medium configured with computer-readable program code, e.g., a computer program product.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

While in one embodiment, the short time Fourier transform (STFT) is used to obtain the frequency bands, the invention is not limited to the STFT. Transforms such as the STFT are often referred to as circulant transforms. Most general forms of circulant transforms can be represented by buffering, a window, a twist (real value to complex value transformation) and a DFT, e.g., FFT. A complex twist after the DFT can be used to adjust the frequency domain representation to match specific transform definitions. The invention may be implemented by any of this class of transforms, including the modified DFT (MDFT), the short time Fourier transform (STFT), and with a longer window and wrapping, a conjugate quadrature mirror filter (CQMF). Other standard transforms such as the Modified discrete cosine transform (MDCT) and modified discrete sine transform (MDST), can also be used, with an additional complex twist of the frequency domain bins, which does not change the underlying frequency resolution or processing ability of the transform and thus can be left until the end of the processing chain, and applied in the remapping if required.

All U.S. patents, U.S. patent applications, and International (PCT) patent applications designating the United States cited herein are hereby incorporated by reference, except in those jurisdictions that do not permit incorporation by reference, in which case the Applicant reserves the right to insert any portion of or all such material into the specification by amendment without such insertion considered new matter. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of other art in this specification should in no way be considered an admission that such art is widely known, is publicly known, or forms part of the general knowledge in the field at the time of invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms “coupled” and “connected,” along with their derivatives, may be used. It should be understood that these terms are not intended as synonyms for each other, but may be. Thus, the scope of the expression “a device A coupled to a device B” should not be limited to devices or systems wherein an input or output of device A is directly connected to an output or input of device B. It means that there exists a path between device A and device B which may be a path including other devices or means in between. Furthermore, “coupled to” does not imply direction. Hence, the expression “a device A is coupled to a device B” may be synonymous with the expression “a device B is coupled to a device A.” “Coupled” may mean that two or more elements are either in direct physical or electrical contact, or that two or more elements are not in direct contact with each other but yet still co-operate or interact with each other.

In addition, use of the “a” or “an” are used to describe elements and components of the embodiments herein. This is done merely for convenience and to give a general sense of the invention. This description should be read to include one or at least one and the singular also includes the plural unless it is obvious that it is meant otherwise.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added to or deleted from methods described within the scope of the present invention.

I claim:

1. A method of operating one or more processors, the method comprising:

post-processing raw banded gains to generate banded post-processed gains to apply to one or more audio signals, the raw banded gains determined by input processing the one or more input audio signals to generate the raw banded gains at a plurality of frequency bands, some of the bands comprising more than one frequency bin, the raw banded gains being in order to carry out one or more of reducing noise, reducing out-of-location signals, reducing echoes, perceptual domain-based leveling, perceptual domain-based dynamic range control, and perceptual domain-based dynamic equalization, wherein the generating of a particular post-processed gain for a particular frequency band includes at least median filtering using raw gain values for frequency bands adjacent to the particular frequency band, thereby yielding median filtered gains, wherein the post-processing is according to one or more properties, including an end condition and a width for the median filtering, and wherein at least one of the end condition of the median filtering and the width of the median filtering depends on signal classification of the one or more input audio signals.

2. A method as recited in claim 1, further comprising:

carrying out the input processing of the one or more input audio signals to generate the raw banded gains at the plurality of frequency bands.

3. A method as recited in claim 1, wherein the post-processing further comprises at least one of frequency-band-to-frequency-band smoothing and smoothing across time of the median filtered gains.

4. A method as recited in claim 3, wherein at least one of the frequency-band-to-frequency-band smoothing and the smoothing across time depends upon signal classification.

5. A method as recited in claim 1, wherein the signal classification includes whether the one or more input audio signals are likely or not to be wind.

6. A method as recited in claim 1, wherein the width of the median filtering depends on the signal classification.

7. A method as recited in claim 1, wherein the signal classification includes whether the one or more input audio signals are likely or not to be voice.

8. A method as recited in claim 1, wherein the signal classification includes whether the one or more input audio signals are likely or not to be noise.

9. A method as recited in claim 1, wherein the frequency bands are on a perceptual or logarithmic scale.

10. A method as recited in claim 1, wherein the input processing is to determine the raw banded gains for reducing noise.

11. A method as recited in claim 1, wherein the input processing is to determine the raw banded gains from more than one input audio signal for reducing noise and out-of-location signals.

12. A method as recited in claim 1, wherein the input processing is to determine the raw banded gains from the one or more input audio signals and one or more reference signals, the determined gains being for reducing noise and echoes.

13. A method as recited in claim 1, wherein the input processing is to determine the raw banded gains for one or more of perceptual domain-based leveling, perceptual domain-based dynamic range control, and perceptual domain-based dynamic equalization.

14. A non-transitory computer-readable medium comprising instructions that when executed by at least one processor of a processing system, cause carrying out a method comprising:

post-processing raw banded gains to generate banded post-processed gains to apply to one or more audio signals, the raw banded gains determined by input processing the one or more input audio signals to generate the raw banded gains at a plurality of frequency bands, some of the bands comprising more than one frequency bin, the raw banded gains being in order to carry out one or more of reducing noise, reducing out-of-location signals, reducing echoes, perceptual domain-based leveling, perceptual domain-based dynamic range control, and perceptual domain-based dynamic equalization, wherein the generating of a particular post-processed gain for a particular frequency band includes at least median filtering using raw gain values for frequency bands adjacent to the particular frequency band, thereby yielding median filtered gains, wherein the post-processing is according to one or more properties, including an end condition and a width for the median filtering, and wherein at least one of the end condition of the median filtering and the width of the median filtering depends on signal classification of the one or more input audio signals.

15. A non-transitory computer-readable medium as recited in claim 14, wherein the instructions when executed, also cause carrying out the input processing of the one or more input audio signals to generate the raw banded gains at the plurality of frequency bands.

16. A non-transitory computer-readable medium as recited in claim 14, wherein the post-processing further comprises at least one of frequency-band-to-frequency-band smoothing and smoothing across time of the median filtered gains.

17. A non-transitory computer-readable medium as recited in claim 16, wherein at least one of the frequency-band-to-frequency-band smoothing and the smoothing across time depends upon signal classification.

18. A non-transitory computer-readable medium as recited in claim 14, wherein the signal classification includes whether the one or more input audio signals are likely or not to be wind.

19. A non-transitory computer-readable medium as recited in claim 14, wherein the width of the median filtering depends on the signal classification.

20. A non-transitory computer-readable medium as recited in claim 14, wherein the signal classification includes whether the one or more input audio signals are likely or not to be voice.

21. A non-transitory computer-readable medium as recited in claim 14, wherein the signal classification includes whether the one or more input audio signals are likely or not to be noise.

22. A non-transitory computer-readable medium as recited in claim 14, wherein the frequency bands are on a perceptual or logarithmic scale.

23. A non-transitory computer-readable medium as recited in claim 14, wherein the input processing is to determine the raw banded gains for reducing noise.

24. A non-transitory computer-readable medium as recited in claim 14, wherein the input processing is to determine the raw banded gains from more than one input audio signal for reducing noise and out-of-location signals.

25. A non-transitory computer-readable medium as recited in claim 14, wherein the input processing is to determine the raw banded gains from the one or more input audio signals and one or more reference signals, the determined gains being for reducing noise and echoes.

26. A non-transitory computer-readable medium as recited in claim 14, wherein the input processing is to determine the raw banded gains for one or more of perceptual domain-based leveling, perceptual domain-based dynamic range control, and perceptual domain-based dynamic equalization.

27. An apparatus comprising:

one or more processors; and a storage medium coupled to the one or more processors, wherein the medium comprises instructions that when executed by at least one processor of the one or more processors, cause carrying out a method comprising:

post-processing raw banded gains to generate banded post-processed gains to apply to one or more audio signals, the raw banded gains determined by input processing the one or more input audio signals to generate the raw banded gains at a plurality of frequency bands, some of the bands comprising more than one frequency bin, the raw banded gains being in order to carry out one or more of reducing noise, reducing out-of-location signals, reducing echoes, perceptual domain-based leveling, perceptual domain-based dynamic range control, and perceptual domain-based dynamic equalization, wherein the generating of a particular post-processed gain for a particular frequency band includes at least median filtering using raw gain values for frequency bands adjacent to the particular frequency band, thereby yielding median filtered gains, wherein the post-processing is according to one or more properties, including an end condition and a width for the median filtering, and wherein at least one of the end condition of the median filtering and the width of the median filtering depends on signal classification of the one or more input audio signals.

28. An apparatus as recited in claim 27, wherein the instructions when executed, also cause carrying out the input processing of the one or more input audio signals to generate the raw banded gains at the plurality of frequency bands.

29. An apparatus comprising:

a post-processor operative to accept raw banded gains determined by input processing one or more input audio signals by an input processor, the post-processor operative to apply post-processing to the raw banded gains to generate banded post-processed gains to apply to the one or more input audio signals, the input processing operative to generate the raw banded gains at a plurality of frequency bands, some of which comprise more than one frequency bin, the raw banded gains being in order to carry out one or more of reducing noise, reducing out-of-location signals, reducing echoes, perceptual domain-based leveling, perceptual domain-based dynamic range control, and perceptual domain-based dynamic equalization, wherein the banded post-processed gains are for applying to the one or more input audio signals, wherein the post-processor includes a median filter operative to carry out median filtering of the raw banded gains, thereby yielding median filtered gains, wherein the generating by the post-processor of a particular post-processed gain for a particular frequency band includes the median filtering using raw gain values for frequency bands adjacent to the particular frequency band, wherein the post-processing is according to one or more properties, including an end condition and a width for the median filtering, and wherein at least one of the end condition of the median filtering and the width of the median filtering depends on signal classification of the one or more input audio signals.

30. An apparatus as recited in claim 29, further comprising:

an input processor operative to accept the one or more input audio signals and to carry out the input processing to generate the raw banded gains at the plurality of frequency bands.

31. An apparatus as recited in claim 29, wherein the post-processor includes a smoothing filter operative to smooth the median filtered gains, including at least one of frequency-band-to-frequency-band smoothing and smoothing across time.

32. An apparatus as recited in claim 29, further comprising a signal classifier operative to generate the signal classification of the one or more input audio signals, wherein the width of the median filtering depends on the signal classification of the one or more input audio signals.

33. An apparatus as recited in claim 29, wherein the signal classifier includes a voice activity detector such that the signal classification includes whether the one or more input audio signals are likely or not to be voice.

34. An apparatus as recited in claim 29, wherein the width of the median filtering depends on the spectral flux of the one or more input audio signals.

35. An apparatus as recited in claim 29, wherein the width of the median filtering for the particular frequency band depends on the particular frequency band.

36. An apparatus as recited in claim 29, wherein the frequency bands are on a perceptual or logarithmic scale.

37. An apparatus as recited in claim 29, wherein the median filtering depends on one or more of a classification of the one or more input audio signals.

38. An apparatus as recited in claim 29, wherein the raw banded gains determined by the input processing are for reducing noise.

39. An apparatus as recited in claim 29, wherein the raw banded gains determined by the input processing are determined from more than one input audio signal and are for reducing noise and out-of-location signals.

40. An apparatus as recited in claim 29, wherein the input processor is further operative to accept one or more reference signals, and wherein the raw banded gains determined by the input processing are determined from the one or more input audio signals and the one or more reference signals, and when applied to the one or input audio signals, for reduce noise and echoes.

41. An apparatus as recited in claim 29, wherein the raw banded gains determined by the input processing are for one or more of perceptual domain-based leveling, perceptual domain-based dynamic range control, and perceptual domain-based dynamic equalization.

* * * * *